United States Patent
Han et al.

(10) Patent No.: US 9,288,048 B2
(45) Date of Patent: Mar. 15, 2016

(54) REAL-TIME FRAME AUTHENTICATION USING ID ANONYMIZATION IN AUTOMOTIVE NETWORKS

(71) Applicant: The Regents of The University of Michigan, Ann Arbor, MI (US)

(72) Inventors: Kyu Suk Han, Ann Arbor, MI (US); Swapna Divya Potluri, San Diego, CA (US); Kang G. Shin, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 14/494,141

(22) Filed: Sep. 23, 2014

(65) Prior Publication Data

US 2015/0089236 A1    Mar. 26, 2015

Related U.S. Application Data

(60) Provisional application No. 61/881,544, filed on Sep. 24, 2013.

(51) Int. Cl.
*H04L 9/32*    (2006.01)
*H04L 9/08*    (2006.01)
*H04L 9/12*    (2006.01)

(52) U.S. Cl.
CPC ............... *H04L 9/0861* (2013.01); *H04L 9/12* (2013.01); *H04L 9/3242* (2013.01); *H04L 9/3271* (2013.01); *H04L 2209/42* (2013.01); *H04L 2209/84* (2013.01)

(58) Field of Classification Search
CPC ...................................................... H04L 9/0861
USPC ........................................................... 713/181
See application file for complete search history.

(56) References Cited

U.S. PATENT DOCUMENTS

| | | | |
|---|---|---|---|
| 8,320,262 B2 | 11/2012 | Fuehrer et al. | |
| 2006/0143448 A1 | 6/2006 | Moroney | |
| 2010/0313009 A1 | 12/2010 | Combet et al. | |
| 2015/0033016 A1* | 1/2015 | Thornton | H04L 9/0825 713/171 |

FOREIGN PATENT DOCUMENTS

KR    2013-0021157 A    3/2013

OTHER PUBLICATIONS

S. Kent et al., Security Architecture for Internet Protocol, Internet Engineering Task Force (IETF), Network WorkingGroup Request for Comments: 2401 r fc 2401), Nov. 1998.

* cited by examiner

*Primary Examiner* — Peter Shaw
(74) *Attorney, Agent, or Firm* — Harness, Dickey & Pierce, PLC

(57) ABSTRACT

A real-time frame authentication protocol is presented for in-vehicle networks. A frame identifier is made anonymous to unauthorized entities but identifiable by the authorized entities. Anonymous identifiers are generated on a per-frame basis and embedded into each data frame transmitted by a sending ECU. Receiving ECUs use the anonymous identifiers to filter incoming data frames before verifying data integrity. Invalid data frame are filtered without requiring any additional run-time computations.

20 Claims, 12 Drawing Sheets

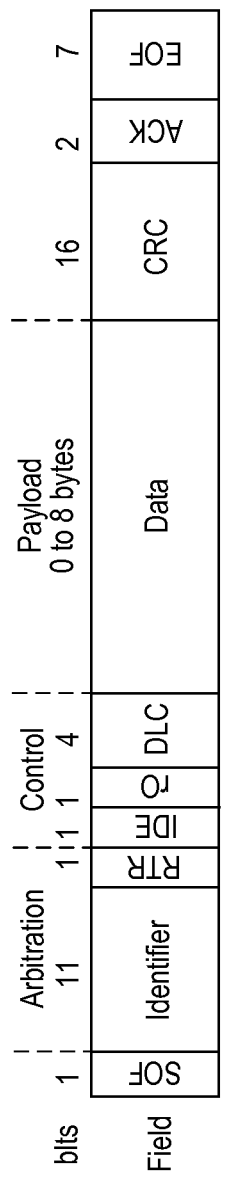
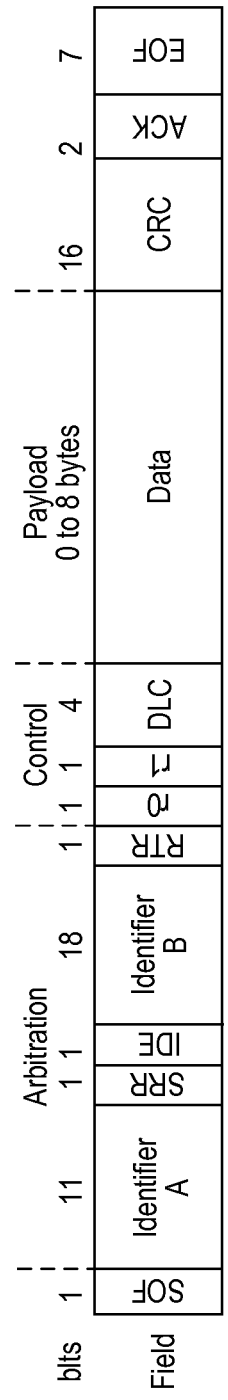
FIG. 2A
FIG. 2B

REAL-TIME FRAME AUTHENTICATION USING ID ANONYMIZATION IN AUTOMOTIVE NETWORKS

CROSS-REFERENCE TO RELATED APPLICATIONS

This application claims the benefit of U.S. Provisional Application No. 61/881,544 filed on Sep. 24, 2013. The entire disclosure of the above application is incorporated herein by reference.

FIELD

The present disclosure relates to a real-time frame authentication using ID anonymization in automotive networks.

BACKGROUND

Modern vehicles are equipped with a large number of electronic control units (ECUs) which vary in processing capability and functional complexity. They monitor and control critical vehicle components such as engine and transmission (powertrain), and non-critical components such as airbags and telenetics. They are interconnected via several in-vehicle networks, such as the Controller Area Network (CAN) which has become the de facto standard due to its widespread deployment. Other standards include the Local Interconnect Network (LIN) which was designed for simpler vehicle components, such as roof, power seats or windows, and FlexRay which provides more capabilities (hence more expensive) than CAN.

CAN was originally designed without security in mind, and its design choices were greatly influenced by such strict constraints as low cost and low network latency in isolated/closed environments. As a result, it cannot ensure data authentication or privacy, thus becoming susceptible to various attacks.

However, vehicle manufacturers are now departing from this closed operation of in-vehicle networks by allowing external entities to send commands from a remote site to in-vehicle components for diagnosis and anti-theft purposes, which accompany new security risks. Several studies have already reported that connecting/exposing a vehicle's internal subsystems to external entities create serious security and safety risks. The security architecture of CAN is too weak to deal with this type of exposure.

There have been various efforts to address sophisticated cyber-vehicle security risks and attacks. For example, Automotive Open System Architecture (AUTOSAR) and the EVITA project focus on development of a standard security architecture. There have also been several research projects aimed at enhancing the security of CAN. However, none of these can cope with Denial-of-Service (DoS) attacks on ECUs. Since ECUs are very resource-constrained for cost and size reasons, requiring them to perform more than a simple computation can degrade/compromise their intended functionality and/or required performance.

To address these and other weaknesses of existing CAN protocols, this disclosure proposes an efficient security protocol which does not require modifications of current, cost-conscious in-vehicle networks.

This section provides background information related to the present disclosure which is not necessarily prior art.

SUMMARY

This section provides a general summary of the disclosure, and is not a comprehensive disclosure of its full scope or all of its features.

A method is presented for authenticating data frames in a vehicle network. At the receiving electronic control unit, the method includes: receiving a current frame identifier in a data frame sent via a serial data link by the sending electronic control unit; generating a next frame identifier in response to receiving the current frame identifier; and storing the next frame identifier in a data store for subsequent processing, where the next frame identifier is derived in part from the current frame identifier and a cryptographic key using an encoding function. Upon receiving another data frame subsequent to receiving the current frame identifier, the receiving electronic control unit extracts a frame identifier from the another data frame without decoding any portion of the another data frame; compares the extracted frame identifier to the next frame identifier residing in the data store; and processes the payload of the another data frame when the extracted frame identifier matches the next frame identifier. Conversely, the another data frame is discarded when the extracted frame identifier does not match the next frame identifier.

When the extracted frame identifier from the another data frame matches the next frame identifier, the receiving electronic control unit also generates a new frame identifier and replaces the next frame identifier residing in the data store with the new frame identifier, where the new frame identifier is derived in part from the extracted frame identifier and a cryptographic key using an encoding function.

Prior to processing the payload of the another data frame, the receiving electronic control unit can authenticate the message content. For example, the receiving electronic control unit can extract a message authentication code from the another data frame and authenticate the payload of the another data frame using the message authentication code, where the message authentication code differs from the extracted frame identifier and is derived in part from the payload in the another date frame.

In one aspect of this disclosure, a communication session is first established between the sending electronic control unit and the receiving electronic control unit. On the sending side, the communication session can be established by selecting a nonce; selecting a hash function for key generation; selecting a keyed hash function for message authentication; generating a hash output by applying the selected keyed hash function to an identifier for the sending electronic control unit, the nonce, and the cryptographic key; and sending an initiation data frame via the serial data link to the receiving electronic control unit, where the initiation data frame includes an identifier for the sending electronic control unit, the nonce, the hash value, an indicator for the hash function, an indicator for the keyed hash function and the hash output.

On the receive side, receiving electronic control unit receives the initiation data frame; determines the selected keyed hash function from the initiation data frame; generates a hash output by applying the selected keyed hash function to the identifier for the sending electronic control unit, the nonce, and the cryptographic key retrieved from the initiation data frame; and generates a session key by applying the selected hash function to the nonce and the cryptographic key when the generated hash output matches the hash output retrieved from the initiation data frame.

In another aspect of the disclosure, a system is presented for authenticating data frames sent from a sending electronic control unit over a vehicle network to a receiving electronic control unit.

On the send side, the electronic control unit includes a send module configured to retrieve the next frame identifier from a local data store, format a data frame with the next frame identifier and transmit the data frame over the vehicle network. The electronic control unit further includes an ID generator configured to retrieve the next frame identifier from the local data store, generate a new frame identifier based in part of the next frame identifier and replace the next frame identifier residing in the send data store with the new frame identifier. In some embodiments, the new frame identifier can be derived from the next frame identifier and a cryptographic key using an encoding function, where the cryptographic key is shared with the receiving electronic control unit.

On the receive side, the electronic control unit includes a filter configured to receive a data frame sent via a vehicle network by the sending electronic control unit. The filter extracts a frame identifier from the received data frame without decoding any portion of the data frame and compares the extracted frame identifier with the next frame identifier. When the extracted frame identifier matches the next frame identifier, a message authenticator receives the data frame from the filter and processes the payload of the data frame. When the extracted frame identifier does not match the next frame identifier, the filter discards the data frame. The electronic control unit further includes an ID generator interfaced with the message authenticator. The ID generator generate a new frame identifier and replace the next frame identifier in the receive data store with the new frame identifier when the extracted frame identifier matches the next frame identifier residing in the receive data store. In some embodiments, the new frame identifier can be derived from the next frame identifier and a cryptographic key using an encoding function, where the cryptographic key is shared with the receiving electronic control unit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A and 2B are diagrams depicting a standard and extended data format, respectively, for a CAN data frame;

Corresponding reference numerals indicate corresponding parts throughout the several views of the drawings.

DETAILED DESCRIPTION

Example embodiments will now be described more fully with reference to the accompanying drawings.

Figure 1:
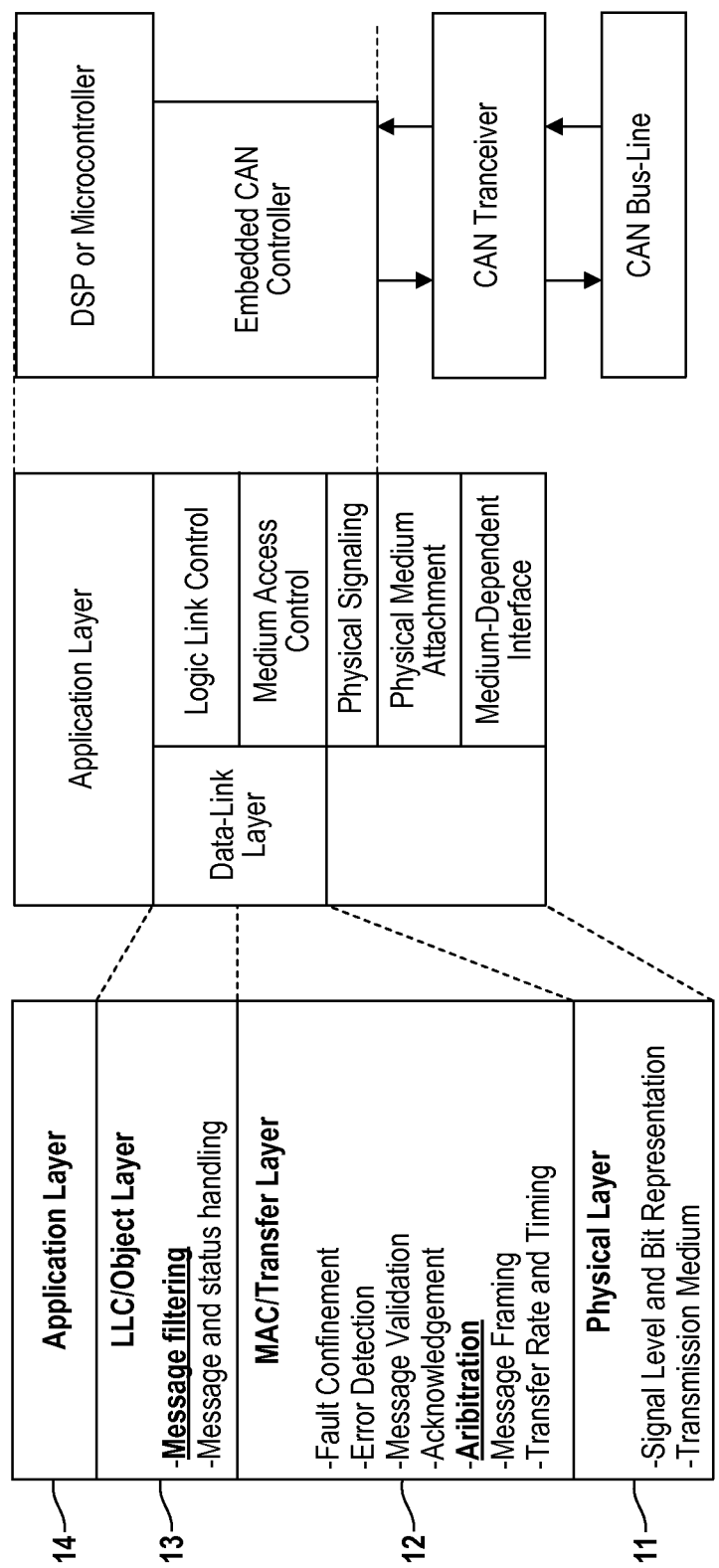
FIG. 1 is a diagram depicting the layered architecture the controller area network.

FIG. 1 depicts a layered architecture of a Controller Area Network (CAN) node with the functions of different layers and ECU components. An electronic control unit (ECU) is a node interconnected between the CAN and other vehicle components, such as sensors or mechanical components. A vehicle usually contains 60-70 ECUs, and the cost-conscious automotive industry makes ECUs very resource-constrained. For example, 8-bit microprocessors are used for light-weight functions such as turning on/off lights, while 32-bit microprocessors are used for more mission/safety-critical functions such as engine control. While particular reference is made to CAN, it is readily understood that the concepts described herein are applicable more generally to other types of vehicle networks, such as LIN or FlexRay.

CAN is composed of four layers: physical layer 11, medium access control (MAC) (or transfer) layer 12, logical link control (LLC) (or object) layer 13, and an application layer 14.

The physical layer 11 defines how signals are actually transmitted. The CAN transceiver resides in this layer.

The transfer layer 12 represents the core of the CAN protocol. Most of the CAN standard corresponds to the transfer layer which receives frames from the physical layer and transmits them to the object layer. It presents the received frame to the object layer and accepts frames to be sent from the object layer. The transfer layer is responsible for fault confinement error detection, frame/message validation, acknowledgement, arbitration, message framing, transfer rate and timing, etc.

The object layer 13 is concerned with message filtering and handling as well as transmission status.

The application layer 14 handles higher-level non-standard operations following a vendor's own design. The CPU or host processor resides in this layer. The host processor determines the meaning of the received messages and which messages to transmit to itself. Sensors, actuators and control devices can be connected to the host processor.

In general, the CAN transceiver and MAC layer are hardware components, while the LLC layer could be a software component.

CAN is a wired multi-master broadcast serial bus that interconnects the various CAN nodes (ECUs) inside a vehicle. There are four types of CAN frames: a data frame that is used to transmit data; a remote frame that requests transmission of data from another ECU; an error frame that is used to indicate an error and transmitted by any unit on detecting a bus error; and an overload frame to introduce extra delay between frames.

The CAN standard data frame format and the extended data frame format are depicted in FIGS. 2A and 2B, respectively. Both contain 1 bit for start of frame (SOF) and 7 bits for end of frame (EOF). The arbitration field contains identifier (ID) bits and 1 bit for setting the remote-transmission-request (RTR) status. The standard frame format allows an 11-bit ID (Identifier field in FIG. 2A), while the extended frame format allows a 29-bit ID (Identifier A and B fields in FIG. 2B). Setting RTR to 1 means that the frame is a remote frame which does not carry any data.

Control field contains a 4-bit data length code (DLC) indicating the number of bytes of data, and reserved bits (1-bit identifier extension (IDE), and 1-bit r0 for the standard frame format and r1 for the extended frame format). For IDE bit, Dominate (0) indicates an 11-bit message ID while Recessive (1) indicates a 29-bit message ID.

Payload of a CAN data frame can carry up to 8 bytes of data. While the data frame is sent autonomously by sender ECUs/nodes, receiver ECUs/nodes can send remote frames to request data from a source node. A 16-bit cyclic redundancy check (CRC) field (with a 1-bit CRC delimiter) is provided to check the integrity of each received frame. 2-bit acknowledgement (ACK) field is used to check whether the frame is received correctly.

Error frames only contains 6 bits of consecutive 'Dominant' or 'Recessive' field with 8-bit 'Recessive' delimiter field. Overload frames only contains 6 'Dominant' bits for flag with 8 'Recessive' bits for the delimiter. Error and Overload frames are special types for abnormal situations, where an error is detected or the extra delay is required. For more information on the CAN frame formats, see ISO 11898-1: 2003 or other related CAN standards. Data frames having other types of formats also fall within the scope of this disclosure.

Since CAN relies on a multi-master broadcast model, each ECU broadcasts frames and the transmission order is decided via a bus contention mechanism called arbitration. Each ECU broadcasts a frame ID, one bit at a time, and determines the transmission priority by comparing each corresponding bit with the bits broadcast by the other ECUs. The frame with the smallest ID wins the arbitration and gets transmitted. After winning the bus arbitration, the ECU writes the data frame serially (i.e., one bit at a time) onto the CAN bus. Other ECUs must wait until the winner's frame transmission is completed.

Figure 3:
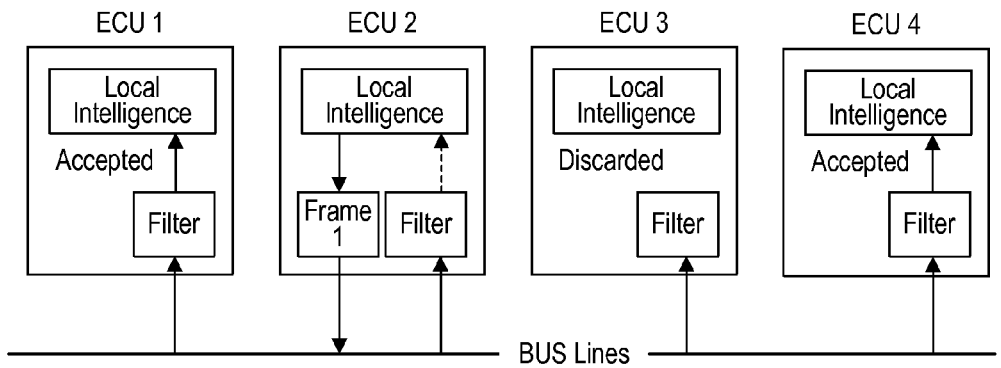
FIG. 3 is a diagram illustrating the CAN communication model.

FIG. 3 illustrates an example CAN communication model. Each data frame include a frame ID but does not contain an address for either the transmitter nor the receiver ECU. A data frame is broadcast over the serial bus, and each node proceeds with message filtering by checking the frame ID to determine whether to accept or ignore it. In the illustrated example, ECU 2 broadcasts frame 1 which is received by all ECUs on the CAN. ECUs 1 and 4 accept the frame, while ECU 3 discards the frame.

Several researchers have already reported the weakness of CAN's security support. For example, researchers have demonstrated vulnerabilities in current automotive networks by presenting various attack scenarios. There have also been reports revealing CAN's weakness in security when it is open to the external world. Other researchers have argued that CAN is insecure and vulnerable to DoS attacks. All of these issues can be attributed to the following major drawbacks of the CAN architecture.

There is no provision for authenticating the sender and the receiver of a frame.

A CAN frame has no authentication field.

The payload field in a CAN frame provides space for only up to 8 bytes of data, making it difficult to implement strong security primitives.

ECU's have too limited computation capability to support strong cryptographic functions.

It is, however, important to note that CAN was designed to be simple and cheap, and to operate in isolation inside a vehicle. Other protocols, such as Flexray, have also been introduced and deployed without addressing these and other security issues. It is difficult to overhaul the entire design of this architecture to support security mechanisms due mainly to automotive manufacturers' reluctance to adopt new standards for cost reasons. Moreover, such cost-consciousness resulted in deploying various types of ECUs as described earlier, which raises significant performance and DoS risks.

Various possible attacks on CAN and the requirements for securing it are discussed next. While most ECUs still operate in an isolated environment, they are getting exposed to external devices through CAN and the on-board diagnostic (OBD) port. There are also a growing number of in-vehicle components connected to external networks through Bluetooth, dedicated short-range communications (DSRC), etc. Also, car manufacturers started remote control services via an external gateway for the engine ignition and door lock/unlock. These increasing exposures of CAN can lead to three types of attack:

M1—physically attaching a rogue ECU to CAN via the OBD port;

M2—remotely comprising ECUs with external interfaces; and

M3—physically compromising ECUs.

Figure 4:
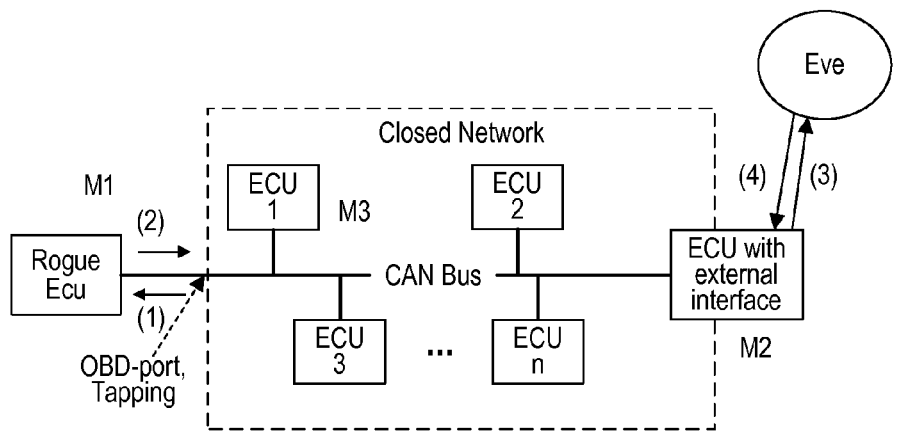
FIG. 4 is a diagram illustrating how a rogue ECU attached to CAN via the OBD port attacks the vehicle.

Several researchers have already demonstrated attacks on CAN via the OBD port. FIG. 4 illustrates how a rogue ECU can read (1) or write (2) frames from/to the CAN bus. The rogue ECU may not follow the CAN's arbitration rule, since it could contain modified hardware components.

In another type of attack, ECUs are remotely compromised with external interfaces. For V2X communications, the in-vehicle network is connected to external entities through a gateway ECU with wireless interfaces, which could be the target of attack for the purpose of compromising in-vehicle components. In addition to, or in place of M1, attackers are likely to attempt to compromise the points exposed to the external world, e.g., gateway ECU and tire pressure monitoring system (TPMS), as shown in FIG. 4.

An attacker can send/receive information to/from the in-vehicle network through the compromised ECU, but can only partially control communications. In this type of attack, the compromised ECU may contain modified software components, but most of its hardware components including the CAN transceiver and arbitration controller remain intact/uncompromised.

Physically compromising an ECU is a third type of attack. In this type of attack, the attacker has full control of the ECU, and hence, has access to the secret information inside it. Under this type of attack, both the hardware and software components of the ECU may have been modified, and hence, it may not follow the CAN arbitration rule. In practice, M3 represents an extreme case, as it requires full modification of an ECU. This disclosure does not consider the case of an attacker physically modifying internal ECUs and extracting or flashing data directly to/from the compromised ECUs, as this is highly unlikely, requiring breaking into the vehicle and physically modifying its ECUs.

Possible attack scenarios based on the above attack models are interception, fabrication, modification, and interruption.

For interception (under M1, M2, or M3), the attacker sniffs CAN and may then use the eavesdropped data or remote frames for replay attacks. Privacy risks of interception-only are not a critical problem for in-vehicle communications, and hence, will not be considered further in this disclosure.

Figure 5A:
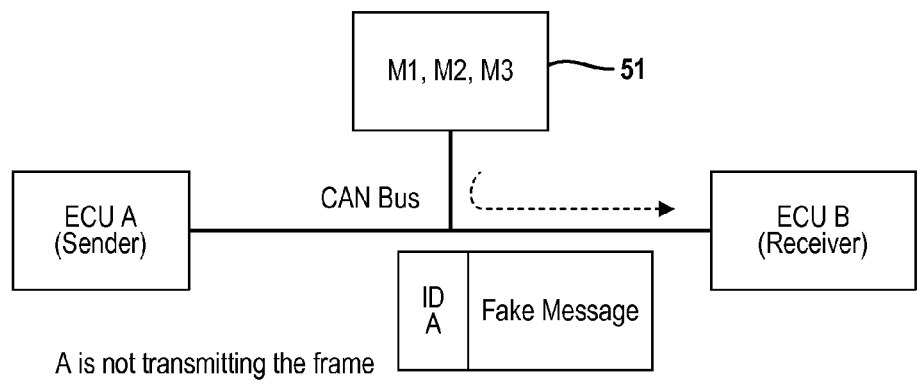
FIG. 5A is a diagram depicting an attack scenario where the attacker impersonates a valid sender sending a frame.

For fabrication (under M1, M2, or M3), the attacker 51 broadcasts fraudulent data or remote frames on CAN as depicted in FIG. 5A. In conjunction with interception, the attacker could also mount a replay attack. That is, the transmission of valid data can be repeated maliciously or fraudulently. The attacker intercepts the data first and retransmits it. This attack can be mounted at any time.

Figure 5B:
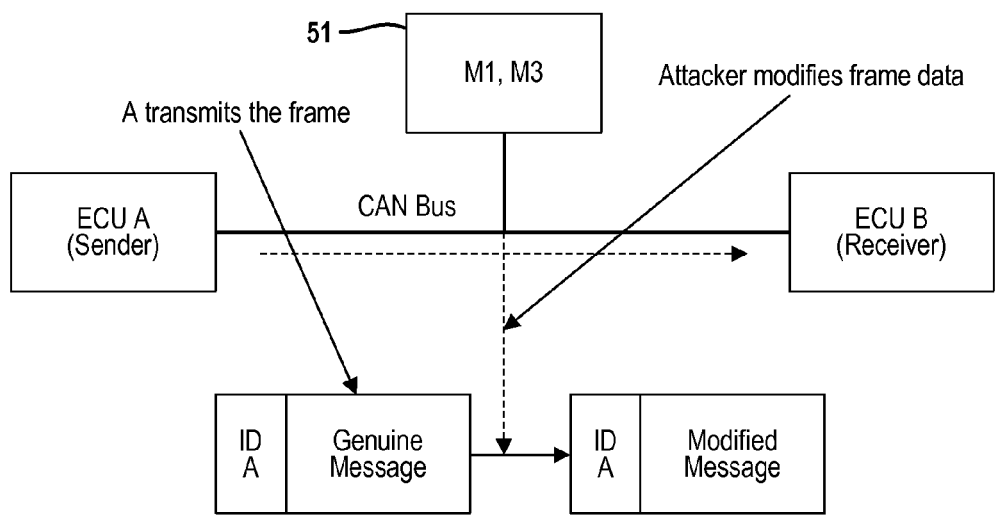
FIG. 5B is a diagram depicting an attack scenario where the attacker modifies the frame transmitted from the valid sender.

For modification (under M1 or M3), the attacker 51 changes the existing data frame to be transmitted on CAN as depicted in FIG. 5B. This type of attack is possible only during the transmission of a genuine frame.

For interruption, the attacker may cripple data transmission with the following attacks. The attacker floods the victim ECU with unwanted requests for information using multiple data frames, thus making the ECU unavailable for legitimate requests, i.e., exhausting the ECU's computation resource. The attacker may also disrupts the ECU's receiver by transmitting a large number of high-priority data, remote, error or overload frames on CAN, thus preventing other ECUs from using the CAN. There is no way to prevent the attacker from transmitting high-priority frames over CAN, but equipping each ECU with a fail-safe mode can be an effective solution against the starvation attack.

To address the vehicular security issues and prevent possible attacks discussed thus far, certain design requirements need to be met under the following assumptions.

First, vehicles have built-in fault-tolerance with feedback mechanisms that can deal with signal spikes/faults. A single compromised frame is usually considered to have negligible impact on physical/mechanical systems.

Second, ECUs can check timestamps. Recent specification of secure hardware extension (SHE) for ECUs includes clock functions. Time synchronization in CAN was also proposed and takes place when the vehicle is turned on. Since the failure of time synchronization results in the failure of initiation, there is no incentive for attackers to cause it.

The security protocol must also be designed to meet the following requirements. The receiver should be able to check the authenticity of a frame against fabrication/injection and modification. The receiver should be able to avoid the retransmission of a valid frame. The protocol should be able to prevent the attacker from crippling ECUs with DoS attacks.

Additional automotive industry requirements include the security protocol should not cause any perceivable delay in delivering data frames to applications and the security protocol should not require any change to the existing CAN architecture. Since ECUs only perform certain functions, various computing devices, such as 8- to 32-bit micro-controllers, have been deployed with computing resources sufficient to handle the required functions. Therefore, the security computation should be within the capability of these resource-constrained devices.

Although the existing protocols check the authenticity of frames, they are still vulnerable to DoS attacks, i.e., an adversary transmits a very large number of frames to the ECUs on CAN. The CAN communication standard does not require node addresses and the content of a frame is only identified by its ID (defining the frame content) upon arrival at every ECU on the bus. Since there is no intermediate protection between the sender and the receiver ECUs, every receiving ECU verifies all frames upon their arrival. Thus, any attacker can transmit fraudulent frames to targets as far as CAN has bandwidth for their transport. On a 100% utilized a 1-Mbps CAN, the attacker can make a maximum of $2^{15}$ attempts for a frame at 1000 ms interval, assuming the attacker fully occupied the CAN. Requiring extensive computation on an ECU can degrade or even cripple its normal operation, especially in view of its limited resources.

There are also inefficiencies due to the CAN specification. The CAN frame format allocates a data field of up to 8 bytes in a frame. The frame data m and message authentication code MAC (k, m), where k is an authentication key, should be less than 64 bits of data in a frame. Certain frames use only a few bits; for example, Boolean type of data often requires at most 1- or 0-bit data. In such a case, assigning MAC could significantly degrade the overall performance. Moreover, in case of a remote frame that contains no data field, it is not possible to assign MAC at all.

In view of these challenges, an improved ID anonymization protocol is presented for vehicle networks. Most of the existing work focuses only on authentication of frames upon their delivery. That is, the target ECUs verify the validity of each frame after receiving it. The two glaring drawbacks of this approach are: (1) receivers first accept all incoming frames irrespective of their validity; and (2) receivers need to do cryptographic computations to verify the validity of all frames, which inevitably incurs a significant additional delay. These, in turn, enable DoS attacks on resource-constrained devices like ECUs.

Figure 6:
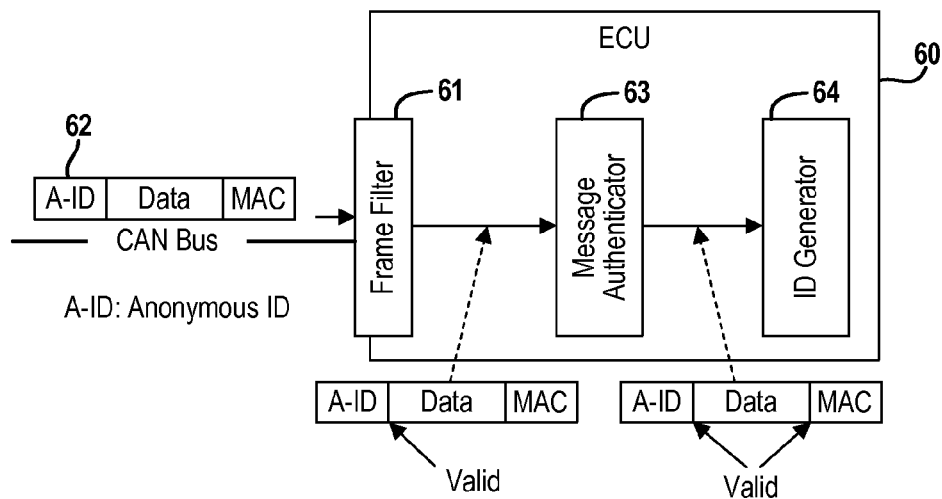
FIG. 6 is a diagram illustrating how the validity of a data frame may be checked by an electronic control unit in a vehicle network.

To overcome these drawbacks, a new concept is presented in which the ID is made anonymous to unauthorized entities, but identifiable by the authorized entities (referred to herein as ID anonymization). With reference to FIG. 6, a frame filter 61 in the ECU 60 is configured to receive an incoming data frame, extract the anonymous ID from the frame and compare the anonymous ID to a pre-computed ID stored locally by the ECU 60. When the IDs match, the data frame is passed along the message authenticator 63 for further processing. The message authenticator 63 in turn checks the validity of frame data using a message authentication code (MAC) embedded in the frame. Once authenticated, the data frame is processed in a conventional manner. Conversely, invalid frames are filtered by the filter 61 without requiring any additional run-time computation by the ECU.

An ID generator 64 is also configured to receive the incoming data frame. When the anonymous ID extracted from the incoming frame matches the pre-computed ID, the ID generator 64 generates a new frame identifier, where the new frame identifier is derived in part from the extracted anonymous ID and a cryptographic key as is further described below. The newly generated frame identifier replaces the pre-computed ID and is used for validating the next data frame.

Figure 7A:
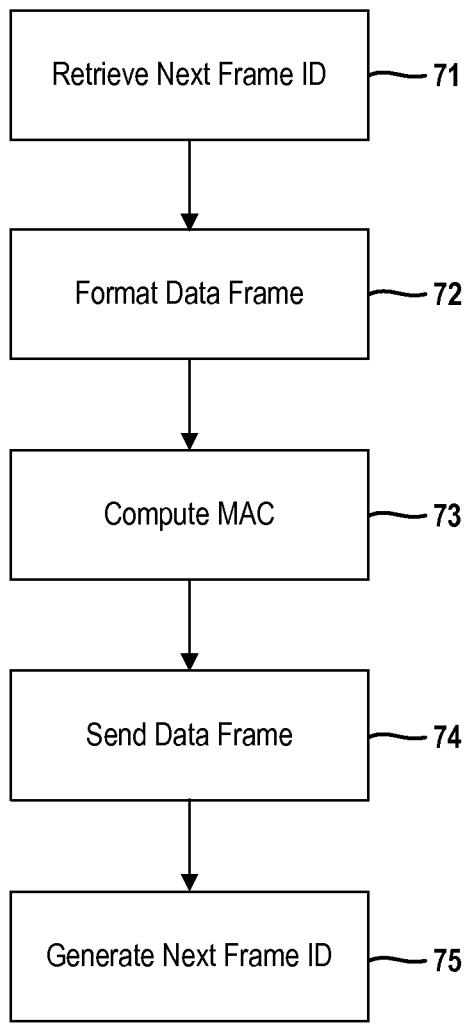
FIG. 7A is a flowchart depicting steps taken by a sending electronic control unit to send a data frame in a vehicle network in accordance with the ID anonymization protocol.

FIG. 7A further depicts the steps taken by a sending electronic control unit to send a data frame in a vehicle network in accordance with the ID anonymization protocol. The data frame is first formatted at 72 in accordance with the applicable communication protocol. For illustration purposes, reference is made to CAN. Of note, the data frame includes an identifier as discussed above in relation to FIGS. 2A and 2B. The proposed anonymized ID is retrieved at 71 from a local data store and inserted into the identifier field of the data frame; remainder of the data frame is formatted in accordance with the application protocol. Once the frame has been formatted, a message authentication code may be computed for the frame as indicated at 73. In one example, the message authentication code is derived from a cyclic redundancy check although other types of codes are contemplated by this disclosure. The message authentication code is appended to the data frame and the data frame is sent at 74 across the vehicle network by the sending electronic control unit.

After sending the data frame, the sending ECU generates the anonymized ID for use in formatting the next frame as indicated at 75. In one example, the anonymized ID (i.e., next frame identifier) is derived from the previous frame identifier and a cryptographic key using an encoding function, such as a keyed hash function. An identifier assigned by the manufacturer may be used as the initial value for the previous frame identifier. The cyptographic key may be any secret key stored locally and shared between the sending ECU and the intended message recipient (i.e., receiving ECU). Alternatively, the cryptographic key may be unique to the communication session and negotiated between the sending ECU and the receiving ECU. The anonymized ID is then stored for use in transmitting the next data frame. It is to be understood that only the relevant steps of the methodology are discussed in relation to FIG. 7A, but that other software-implemented instructions may be needed to control and manage the overall operation of the sending ECU.

Figure 7B:
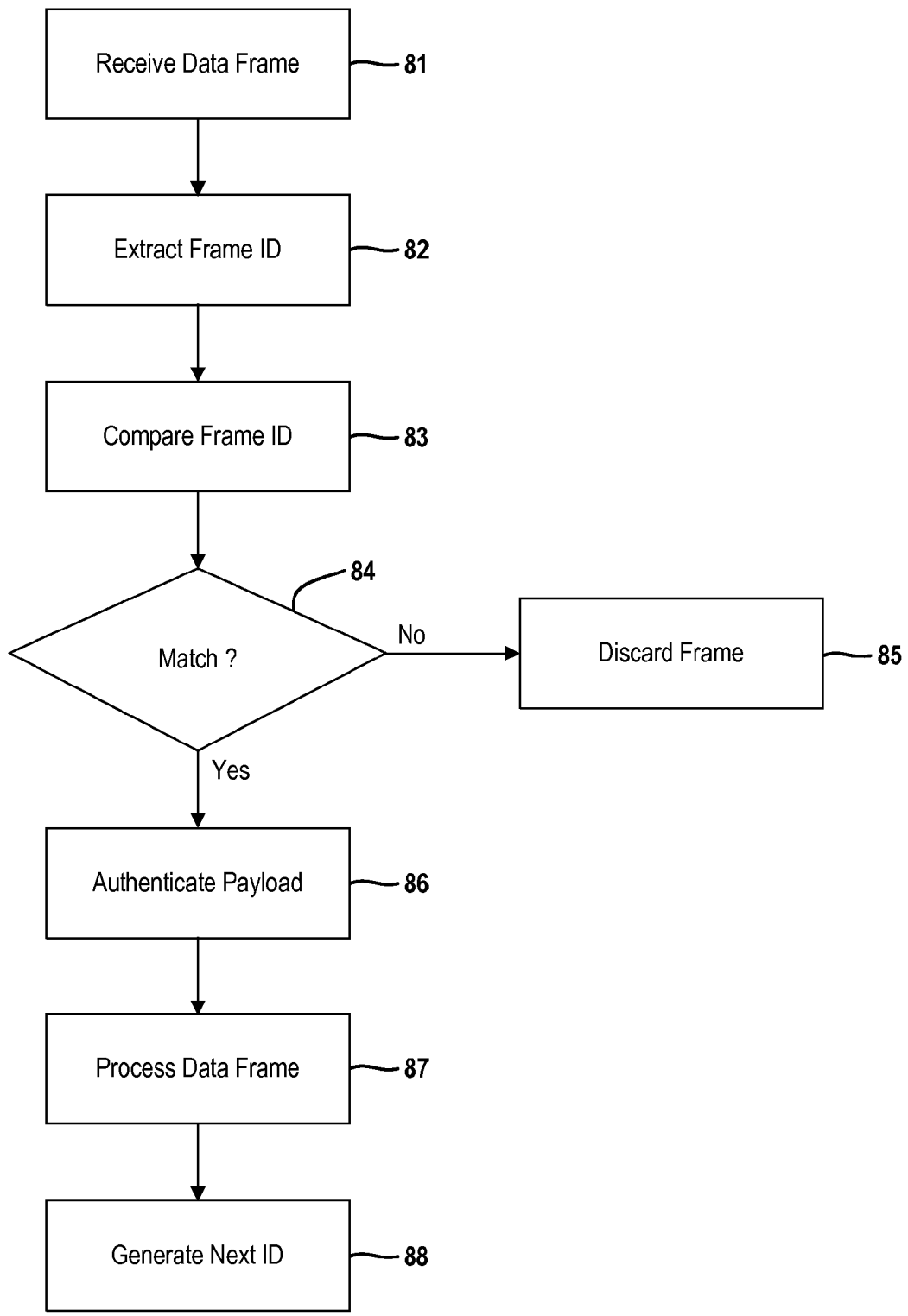
FIG. 7B is a flowchart depicting steps taken by a receiving electronic control unit in accordance with the ID anonymization protocol.

Steps taken by the receiving electronic control unit upon receiving a data frame are shown in FIG. 7B. Upon receipt, the anonymized ID is first extracted from the data frame without decoding any portion of the data frame as indicated at 82. Next, the extracted anonymized ID is compared at 83 with a stored frame identifier which has been derived from the immediately preceding data frame. When the extracted frame identifier matches the stored frame identifier, payload of the incoming data frame is authenticated at 86. In particular, the message authentication code is extracted from the incoming data frame and used to authenticate the data frame, where the message authentication code differs from the extracted frame identifier and is derived in part from the payload in the incoming date frame. For example, the payload of the data frame can be authenticated using a cyclic redundancy check. Once authenticated, the incoming data frame can be processed as indicated at 87. Conversely, when the extracted frame identifier does not match the stored frame identifier or the payload is not authenticated, the incoming data frame is discarded as indicated at 85. It is to be understood that only the relevant steps of the methodology are discussed in relation to FIG. 7B, but that other software-implemented instructions may be needed to control and manage the overall operation of the receiving ECU.

IA-CAN protocol introduced above authenticates both sender entities and messages. Only an authorized sender/receiver can generate/identify a valid anonymous ID using a shared secret key and a random nonce. The frames broadcast by a valid sender will be received by only a valid receiver whose filter contains a matching pre-computed anonymous ID. The authorized receiver will immediately filter out invalid frames without requiring any computation. An unauthorized ECU on vehicle network cannot identify the original frame ID from an anonymous ID. The authorized receiver will immediately filter out invalid frames without requiring any computation. An unauthorized ECU on the vehicle network cannot identify the original frame ID from an anonymous ID. Since each anonymized ID is used only once, the attacker does not gain anything from reusing the captured ID, i.e., replay attack is not possible.

An anonymous ID provides message authentication against M2, which is the most probable attack. In the case of message modification by ignoring the CAN arbitration rule, the payload data is verified by the payload data authentication code. It prevents the attackers from randomly modifying the payload of unidentified frames by overriding bits on the CAN. Compared to previous models, IA-CAN can save more payload bits with a smaller MAC in conjunction with anonymized IDs.

Since the frame ID is altered on a per-frame basis, the attacker cannot replay frames using sniffed IDs as they will no longer be valid. IA-CAN is resilient to DoS attacks on ECUs as the receiver ECU will only accept frames with IDs that match the pre-computed ones. Since each ID to be filtered/passed needs to do only 11- or 29-bit string XOR computations, the associated overhead is negligible. The runtime overhead for frame authentication is incurred only when the frame is accepted by the frame filter.

Lastly, IA-CAN uses a two-step authentication process, and does not incur any additional latency compared to previous models. The computation delay for generating anonymous ID migrates from post-delivery of a frame to its pre-delivery, since the receiver pre-computes an anonymous ID in parallel with the transmission of the current frame. This reduces the communication latency significantly. The performance impact of generating anonymous IDs is discussed later in this disclosure. While payload data authentication to secure data frames incurs an additional runtime delay, the overall latency for the two-step authentication is the same as the previous models.

Figure 8:
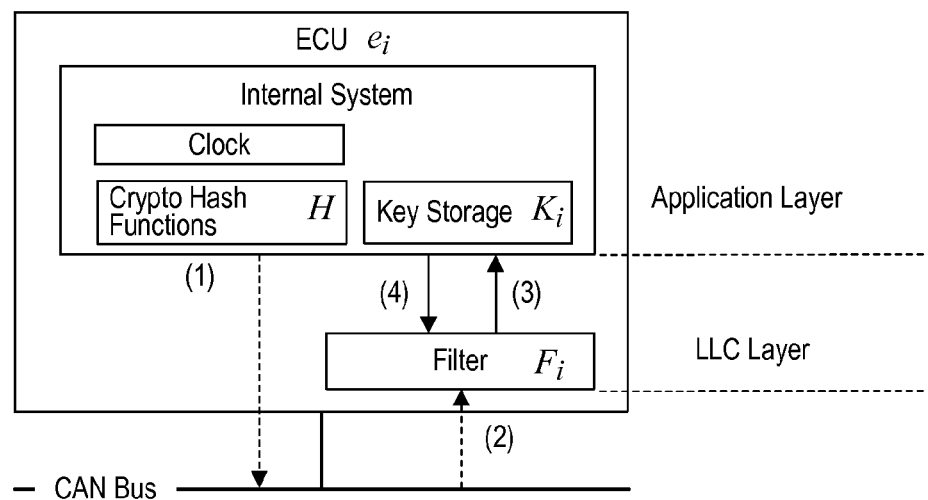
FIG. 8 is a diagram depicting a framework for authenticating data frames by a controller.

FIG. 8 depicts in more detail a system model for IA-CAN. In an example embodiment, the system under consideration consists of n ECUs, $e_i$, $1 \leq i \leq n$, connected to a vehicle network. Each ECU $e_i$ contains a reconfigurable frame filter $F_i$, a set of keys $K_i$, and a set of cryptographic hash functions H.

The frame filter $F_i:=\{id_{j,Y}, id_{j,Y}^R\}$ maintains a list of frame IDs that it accepts, where $id_{j,Y}$ is a unique data frame ID, $id_{j,Y}^R$ is a unique remote frame ID, $0 \leq j \leq 2^{11}$ (or $2^{29}$), and $\gamma \leq N$, N is a maximum preset integer. Initially, $F_i:=\{id_{j,0}\}$. While the length of $id_{j,0}$ is 11 (standard format) or 29 bits (extended format), the length of $id_{j,Y}$ is defined as $11-\alpha+\zeta$ bits or $29-\alpha+\zeta$ bits for $id_{j,Y}$ and $(16-\alpha)$ bits or $(34-\alpha)$ bits for $id_{j,Y}^R$, where $\alpha$ is the number of bits used to specify priority and $\zeta$ is that to specify the data field. For remote frames, $\alpha$ is an option.

Figure 9:
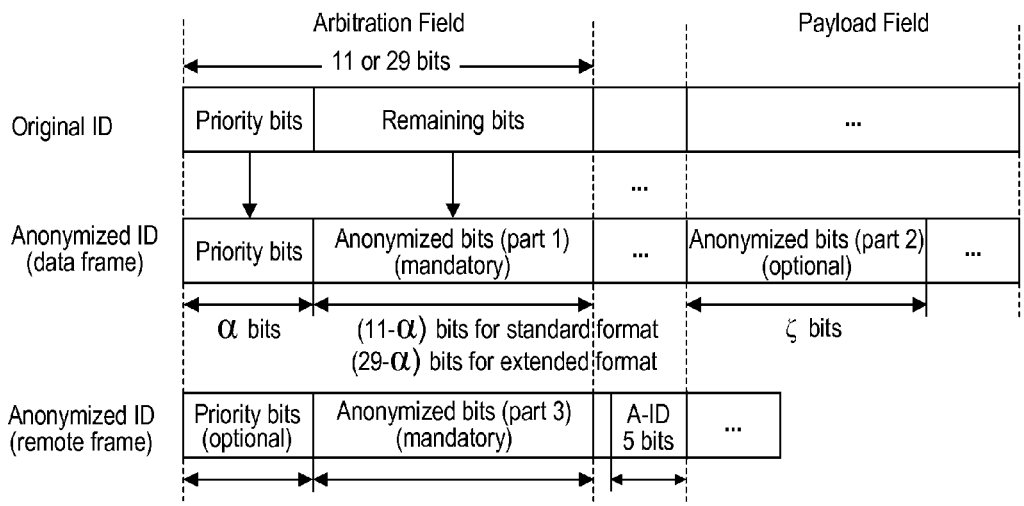
FIG. 9 is a diagram illustrating how priority bits are preserved in certain data frames.

To ensure compatibility with CAN, the frame must be ensured to be transmitted according to their priority specified in their frame IDs. Thus, there is a need to ensure the preservation of frame priorities even after ID anonymization. To meet this requirement, the priority bits in the ID are kept intact and only the remaining bits are anonymized as shown in FIG. 9. If the first a bits are used to specify priority, then the remaining $(11-\alpha)$ or $(29-\alpha)$ bits are used for ID anonymization. For example, the SAE J1939 standard assigns the first 3-bits of the 29-bit ID for specifying priority.

To make brute-force attacks difficult on a small number of anonymized bits (i.e., $11-\alpha$ or $29-\alpha$ bits), an additional $\zeta$ bits are borrowed from the data field to expand the anonymization field as shown in FIG. 9. In such a case, two-step frame filtering is required: a frame is filtered first by the ID field at the frame filter (step 2 in FIG. 8), and then by the anonymized bits in the data field (step 3 in FIG. 8). Since the remote frame contains no data field, bits from the data field cannot be borrowed, but up to 5 bits can be assigned in the control field (DLC and r0). Also, α bits can also be assign as an option.

In the example embodiment, the set $K_i:=\{\{id_{j,0}, k_j\}\}$ maintains a set of secret keys associated with $F_i$, where $k_j$ is a symmetric long-term key associated with $id_{j,0}$. ECUs send/receive a frame with $id_{j,0}$ containing $k_j$. The key management works as described next. IA-CAN follows the key management model further described in "CANAuth—A Simple, Backward Compatible Broadcast Authentication Protocol for CAN bus", (A. Herrewege et al., 10$^{th}$ escar Embedded Security in Cards Conference (November 2011)) that assigns a pre-shared long-term key to each unique frame ID. Each group of ECUs receiving a certain frame ID gets a pre-shared key uniquely assigned by manufacturers. The keys are stored in a tamper-proof storage and can be queried only by the node itself as stated in assumption A1. The lifetime of an ECU is usually the same as that of the vehicle, and hence, the size of an initial long-term key should be designed to support for approximately 10 to 15 years.

ECUs are capable of cryptographic computation, as specified in the Automotive Open System Architecture (AUTOSAR) standards. Several algorithms are specified in "Specification of Crypto Service Manager" (AUTOSAR 2013, Technical report, Automotive Open System Architecture (2013)). In the example embodiment, HMAC-SHA1 is used for the evaluation of IA-CAN although numerous other cryptographic functions fall within the scope of the disclosure.

Secure Hardware Extension (SHE) specifies the clock function deployment into ECUs, although the CAN standard does not specify time synchronization. The authors of "Message Authenticated CAN" (Hartkopp et al, CAN escar 2012, Embedded Security in Cars Conference, Berlin, Germany (November 2012)), proposed time synchronization using the clock in ECUs over CAN. Thus, the proposed protocol assumes ECUs with the clock function and time synchronization between ECUs.

IA-CAN is designed to address all the attack scenarios mentioned earlier. Table I below shows a complete set of notations and their descriptions. For discussion purposes, consider a sender ECU $e_1$ broadcasting a frame associated with $id_{j,0}$ to a target ECU $e_2$ among the receiver group.

TABLE I

Notations

| Type | Description |
|---|---|
| $\gamma, \delta$ | Frame and session sequence numbers. |
| i, j | Unique ifentifiers of the ECU and the frame ID |
| H | A set of cryptographic hash functions H = $\{h_1, h_2, \ldots\}$. (MD5, SHA-1, SHA-2 (224/256/384/512 bits), HMAC, CMAC or other authentication protocols can be used to support various types of ECUs.) |
| $id_{j,\gamma}$ | The $\gamma^{th}$ anonymized frame ID. $\gamma = 0$ for the orginal ID assigned by manufacturers. |
| $id_{j,\gamma}{}^H$ | The $\gamma^{th}$ anonymized ID for remote frame ID. |
| $f_1$ | The message authentication code chosen by ALG. |
| $f_2$ | One-way function that retrieves $id_{j,\gamma}$ and $REM_{j,\gamma}$ |
| ALG | The indicator of algorithm in H chosen for the protocol |
| $sel_{1,\delta}$ | Random nonce to select $f_2$ that retrieves $id_{j,\gamma}$ |
| $k_j$ | A pre-shared secret key associated with $id_{j,0}$. |
| $k_j{}^{\delta,J}$ | A session key for anonymous ID with $id_{j,0}$. |
| $k_j{}^{\delta,P}$ | A session key for payload authentication code generation with $id_{j,0}$. |
| $REM_{j,\gamma}$ | Remaining bits of $Output_{j,\gamma}$ after extracting $id_{j,\gamma}$ |
| $ctr_{j,\gamma}$ | Predefined counter set for $id_{j,0}$, $0 \le \gamma \le \theta$ |
| $T_j$ | Pre-defined frame time interval |

A session refresh phase is initiated when a session is set up between $e_1$ and $e_2$ for the first time, or when the session key needs to be refreshed. For example, a session refresh can be done when the car is getting turned on, or the counter reaches the maximum present count, $ctr_{j,\theta}$. Considering general public driving patterns, it is reasonable to assume a session period of 24 hours. Or, against M2, the session can be shortened. The maximum $\theta$ or session period can be pre-defined by the vehicle manufacturer during the design of CAN. Under A2, a session can be refreshed every minute, hour, day, or a pre-defined period with the maximum count $T_j \times ctr_{j,\gamma}$.

ECUs $e_1$ and $e_2$ must agree on a random nonce $sel_{j,\delta}$, and algorithm ALG (to select a MAC in H) for generation of the session update information, $Update_{j,\delta}$. $e_1$ first selects $sel_{j,\delta}$ and generates a hash output $Update_{j,\delta}$:

$$f_1 := \{id_{j,0}, sel_{j,\delta}, k_j, RM_{j,\gamma}\} \rightarrow Update_{j,\delta}.$$

When the session is initiated for the first time, $REM_{j,\gamma}$ is not included in $Update_{j,\delta}$. $REM_{j,\gamma}$ is used to maintain the freshness of an update request. If ECUs support time synchronization, current timestamp—instead of $REM_{j,\gamma}$—can be included to prevent replay attacks.

Figure 10:
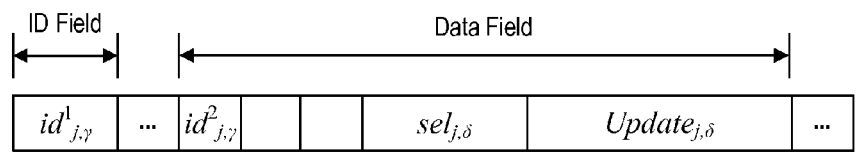
FIG. 10 is a diagram depicting a data frame for a session refresh.

Selection of a MAC from H will affect the output size. For example, using HMAC with SHA-1 for $f_1$ would result in a 160-bit output, which can be transmitted in multiple frames. Or, a truncated output can also be used to transmit in a single frame. Then, $e_1$ sends $sel_{j,\delta}$, $Update_{j,\delta}$ to $e_2$ as shown in the format of FIG. 10. $id_{j,\gamma}{}^1$ is an anonymous ID for the frame, and $id_{j,\gamma}{}^2$ is $\zeta$ bits borrowed from the data field. Initially, $id_{j,\gamma}{}^1 = id_{j,0}$ and $id_{j,\gamma}{}^2$ are padded with 0s. INIT is to indicate that the frame is for session refresh, and ALG is for indicating h and $f_1$ from H.

Figure 12:
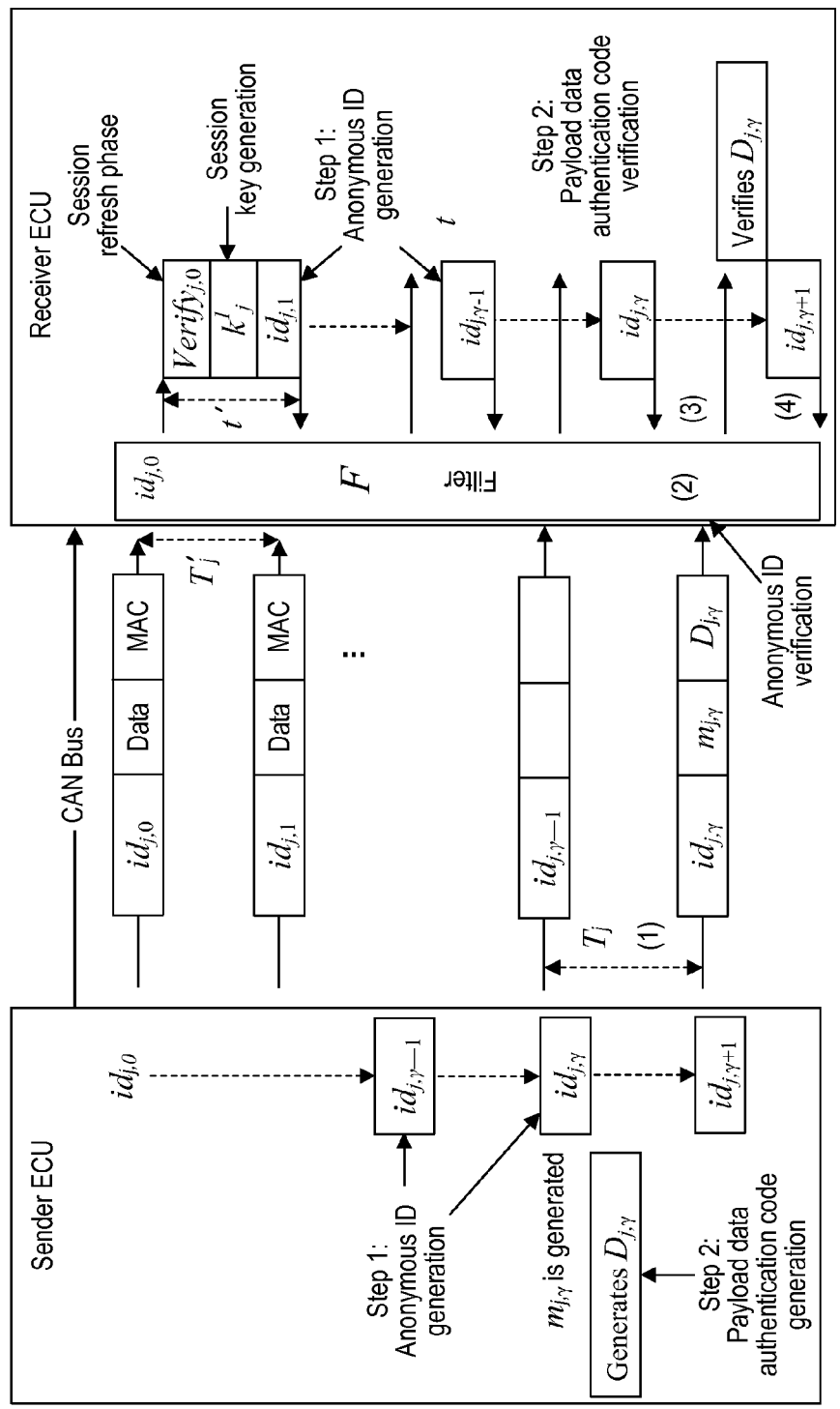
FIG. 12 is a diagram illustrating the process for authenticating data frames in a vehicle network.

When $e_2$ receives a frame, as shown in FIG. 12, it verifies $Update_{j,\delta}$ by generating $Verify_{j,\delta}$, where $f_1$: $\{id_{j,0}, sel_{j,\delta}, REM_{j,\gamma}\} \rightarrow Verify_{j,\delta}$. If $Update_{j,\delta}, e_2$ accepts $sel_{j,\delta}$ to update the session key as follows. $e_2$ generates $k_h{}^{\delta,J}$ and $k_j{}^{\delta,P}$ where $h: \{k_j, sel_{j,\delta}\} \rightarrow \{k_j{}^{\delta,J}, k_j{}^{\delta,P}\}$. The key generation function h is chosen from H.

During the session $\delta$, both $e_1$ and $e_2$ generate anonymous IDs (not at the same time, though) using the session key $k_j{}^{\delta,J}$ shared between them. $e_1$ and $e_2$ generate $id_{j,\gamma}$ and $id_{j,\gamma}{}^r$ as follows.

On the sender side, as soon as $e_1$ finishes sending the (previous) frame with $id_{j,\gamma-1}$ (as shown in FIG. 12(1)), it generates $Output_{j,\gamma}$ from $id_{j,\gamma-1}, id_{j,\gamma-1}{}^R, REM_{j,\gamma-1}$ and $k_j{}^{\delta,J}$ using $f_1$.

$$f_1: \{k_j{}^{\delta,J}, id_{j,\gamma-1}, id_{j,\gamma-1}{}^R, REM_{j,\gamma-1}\} \rightarrow Output_{j,\gamma}.$$

Next, $id_{j,\gamma}$ is extracted from $Output_{j,\gamma}$ using $$f_2: \{Output_{j,\gamma}\} \rightarrow \{id_{j,\gamma}, id_{j,\gamma}{}^R, REM_{j,\gamma}\}$$

$e_1$ and $e_2$ store $id_{j,\gamma}{}^R$ and the remaining bits $REM_{j,\gamma}$ after the ID is extracted. $id_{j,\gamma}{}^R$ is used only when $e_2$ needs to send a remote frame. $e_1$ also updates $id_{j,\gamma}{}^R$ at its frame filter. There can be several ways to select $id_{j,\gamma}$ from $Output_{j,\gamma}$, but we assume $f_2$ to truncate $Output_{j,\gamma}$ to fit the size of $id_{j,\gamma}$ and $id_{j,\gamma}{}^R$. $e_1$ then updates $id_{j,\gamma}$ to $id_{j,\gamma+1}$, and stores $REM_{j,\gamma}$ to generate the next anonymous ID.

On the receiver side, as soon as $e_2$ receives the previous frame and verifies it, it generates $Output_{j,\gamma}$ with $k_j{}^{\delta,J}$, $id_{j,\gamma-1}$, and $REM_{j,\gamma-1}$, and then retrieves $id_{j,\gamma}$ and $id_{j,\gamma}{}^R$. The filter $F_2$ immediately replaces $id_{j,Y-1}$ with $id_{j,Y}$ in the frame acceptance list (as shown in FIG. 12 (4)). $e_2$ now waits for the next frame with the new ID $id_{j,\gamma}$. At such iteration or after a certain time elapsed, the counter is incremented by 1 until it reaches $ctr_{j,\theta}$. The time period of $id_{j,0}$ is preset as a design parameter. When the counter reaches $ctr_{j,\theta}$, $REM_{j,\gamma}$ is used to generate $Update_{j,\delta}$, which is then transmitted with $id_{j,\gamma}$.

As described earlier, a remote frame is transmitted by a receiver ECU $e_2$, when it needs to request a data frame. Since the remote frame does not contain the data field, it can use 4 bits of the DLC field for an anonymous ID. The reserved bit r0 can also be used.

As the CAN standard specifies both Data and Remote frames to share same identifier, different anonymous IDs are designed for the two types of frames. While the ID of a Data frame is $id_{j,\gamma}$, assign $id_{j,\gamma}^R \neq id_{j,\gamma}$ as the ID of a Remote frame which (16−α) bits (the standard format) or (34−α) bits (the extended format) extracted from $REM_{j,\gamma}$. For the Remote frame, α can be an option.

Figure 11A:
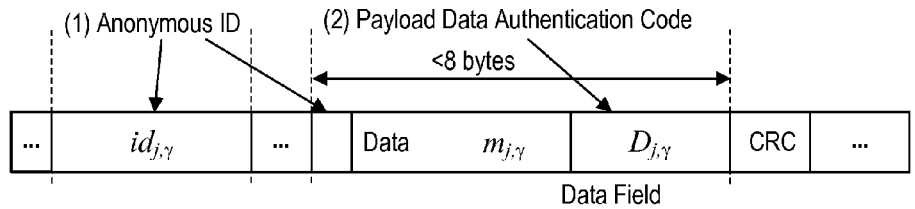
FIGS. 11A and 11B are diagrams illustrating placement of an anonymous identifier in a standard and remote data frame, respectively.

Use of anonymous IDs prevents injection of unauthorized frames (defense against M2). However, attackers with M1 or M3 can modify frame data, although they represent extreme cases. So, we also provide data authentication for payloads. A MAC is generated for a payload. When a payload $m_{j,\gamma}$ is generated, sender ECU $e_1$ generates a β-bit MAC $D_{j,\gamma}$, where $f_1: \{k_j^{\delta,P}, m_{j,\gamma}, REM_{j,\gamma}\} \to D_{j,\gamma}$. $e_1$ then puts $D_{j,\gamma}$ in the data field as depicted in FIG. 11A. The size of β is a design parameter. For practical security strengths, 11 (or 29)−α+ζ+β≥32 is recommended, where 11 (or 29) −α+ζ is the size of anonymous ID and β is the size of $D_{j,\gamma}$.

While IA-CAN proceeds with anonymous ID generation immediately after the previous frame is transmitted/received, since it has no relation with the frame data itself, MAC for payload authentication can be generated when the payload data $m_{j,\gamma}$ is generated/received. Thus, the runtime latency $t_m$ for payload data authentication code generation is invoked.

Figure 11B:
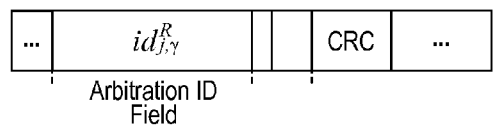

For the Remote frame in FIG. 11B, this phase is skipped since it has no data field.

When $e_2$ receives a message, it checks whether the frame ID $id_{j,\gamma}$ matches one of IDs in the acceptance filter list $F_2$ (FIG. 12(2)). If a match is found (as shown in FIG. 12(2)), $e_2$ accepts the frame and then performs an integrity check, for example using CRC (FIG. 12(3)).

For a non-zero-bit data frame, $e_2$ verifies the authenticity of message $m_{j,\gamma}$ by comparing $D_{j,\gamma}$ with $D^{recv}$ where $f_1: \{m_{j,\gamma}, REM_{j,\gamma}, k_j^{\delta,P}\} \to D^{recv}$. If $D_{j,\gamma} \equiv D^{recv}$, $e_2$ accepts the frame. Whether $e_2$ accepts the frame, or the time period $T_j$ ends (when time synchronization is available), it repeats the process in the Anonymous ID generation phase to generate the next ID $id_{j,\gamma+1}$ (FIG. 12(4)).

For a Remote frame, as soon as $e_1$ accepts the frame, it filters the valid $id_{j,\gamma}^R$. Then, the sender ECU $e_1$ can send the data frame with $id_{j,\gamma}$.

Next, the security of IA-CAN is evaluated and analyzed. In particular, it is shown that IA-CAN provides frame authentication against injection and modification, and is secure against replay attacks and interruption, which are the requirements listed earlier in this disclosure. The following definitions will be used here.

Definition 1. A MAC generator H: $(k_j, m_1, m_2, \ldots m_t) \to Y_N$ satisfies the first and second preimage resistance as well as collision-freedom, and transforms t arbitrary messages/frames m to a uniformly-distributed N-bit hash output $Y_N$ using a shared key $k_j$.

Definition 2. A function T: $Y_N \to (Y_n, Y_{N-n})$ truncates $Y_N$ to $Y_n$ and $Y_{N-n}$, where $Y_n$ is an n-bit truncated part of $Y_N$, n≤N, while $Y_{N-n}$ is the remaining (N−n) bits of $Y_N$. For example, consider a truncated output from a 160-bit hashed output using SHA-1.

Definition 3. An attacker Adv's function A: $m^{Adv} \to Y_n^{Adv}$ is used to generate $Y_n^{Adv}$ which is to be believed as $Y_n$ using his own resource $m^{Adv}$. It is assumed that Adv can obtain $id_{j,\gamma-1}$, AG and $sel_{j,\delta}$ by eavesdropping on the CAN bus.

The security of IA-CAN is shown against the attacker's malicious injection. An attacker Adv with M1, M2 or M3 can inject a fraudulent Data frame or a fraudulent Remote frame to the CAN bus. Suppose Adv injects a fraudulent Data frame with $id^{Adv}$ and $P^{adv}$.

Security of Anonymous ID (Step 1 only). Show the security of anonymous ID by following four theorems. Let $Y_N^i$ be the i-th hash output of N bits, where H: $(K, Y_n^{i-1}, Y_{N-n}^{i-1}) \to Y_N^i$ and let $Y_n^i$ be the i-th frame ID formed by truncating n bits out of an N-bit string.

Theorem 1. Authorized entities can identify the message he must accept.

Proof. An authorized user U who already knows $k_j, Y_n^{i-1}$, $Y_{N-n}^{i-1}$ can generate $Y_n^i$. Thus U can immediately identify whether the received message $R_n$ is identical to the pre-computed $Y_n^i$. Thus, Theorem 1 follows. Thus, a pseudo-random number generator or bloom filter is not used to satisfy Theorem 1.

Theorem 2. The probability that Adv finds $id^{Adv}$, where $id^{Adv} \equiv id^{j,\gamma}$, with A is not higher than the probability that Adv randomly selects it.

Proof. Adv who does not know $k_j$ and $Y_{N-n}^{i-1}$ can intercept $Y_n^{i-1}$ from the previous transmission. If Adv knows $Y_n^{Adv_i}$, which $Y_n^{Adv_i} \equiv Y_n^i$, he can identify $Y_n^i$ being transmitted or send a fraudulent frame with $Y_n^{Adv_i}$. However, by Definition 1, the probability of generating a compromised message $Y_n^{Adv_i}$ with known information $Y_n^{i-1}$ is not greater than the probability of finding collision from a randomly-generated message. Thus, the theorem holds.

Theorem 3. A success in compromising a message does not increase the probability of compromising the subsequent messages.

Proof. Let the probability of Adv's success in finding $Y_n^{Adv_i}$ be $Pr_{Succ_i}^{Adv} = Pr[A:(m^{Adv_i}) \to Y_n^{Adv_i} \cap Y_n^{Adv_i} \equiv Y_n^i]$. Once Adv succeeds in finding the collision $Y_n^{Adv_i}$, he will try to find the next collision $Y_n^{Adv_{i+1}}$ using $m^{Adv_i}$, in addition to $m^{Adv_{i+1}}$, with a success probability $Pr_{Succ_{i+1}}^{Adv}$, where $Pr_{Succ_{i+1}}^{Adv} = Pr[(m^{Adv_{i+1}} | m^{Adv_i}) \to Y_n^{Adv_{i+1}} \equiv Y_n^{i+1}]$. If a successful finding of collision does not increase the probability of finding future collisions, $Pr_{Succ_i}^{Adv} = Pr_{Succ_{i+1}}^{Adv}$, then Lemma 3 holds.

Since $Y_n^i$ is generated by truncating $Y_N^i$, the probability of finding a collision from $Y_N^i$ is the same as that of finding a collision from the full-sized hash output. While $Y_N^{i+1}$ is generated from $Y_n^i, Y_{N-n}^i$, as H:$(K, Y_n^i Y_{N-n}^i) \to Y_N^{i+1}$, and $Y_n^{i+1}$ is also a truncation of $Y_N^{i+1}$, the probability of finding a collision of $Y_N^{i+1}$ only depends on the strength of $Y_N^{i+1}$, which has the same probability of finding a collision of $Y_N^i$. Therefore $Pr_{Succ_{i+1}}^{Adv}$ and $Pr_{Succ_i}^{Adv}$ are independent, and $$Pr_{Succ_{i+1}}^{Adv} = Pr[m^{Adv_{i+1}} | m^{Adv_i}]$$
$$= Pr[m^{Adv_{i+1}}] Pr[m^{Adv_i}] / Pr[m^{Adv_i}]$$
$$= Pr[m^{Adv_{i+1}}]$$
$$= Pr[m^{Adv_i}]$$
$$= Pr_{Succ_i}^{Adv}$$

So, $Pr_{Succ_i}^{Adv} = Pr_{Succ_{i+1}}^{Adv}$. So, even though the attack collides with $Y_n^i$, it doesn't affect/increase the probability of finding collisions for the other $Y^{i+1}$, and hence, the theorem holds.

Theorem 4. A single success of compromising a message does not affect the entire protocol operation.

Figure 13:
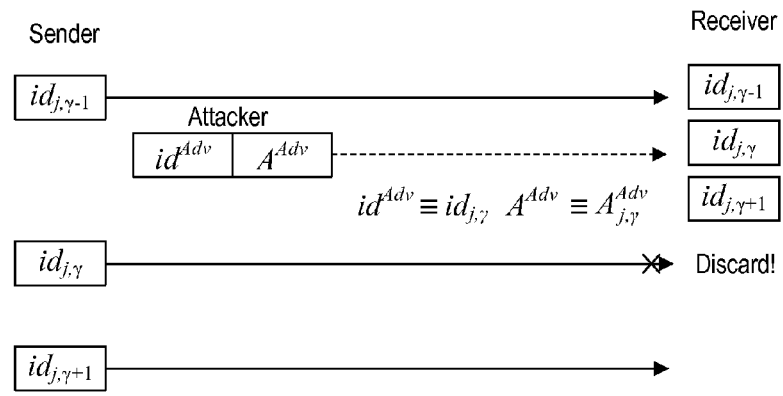
FIG. 13 is a diagram illustrating how a single success in sending a bogus message does not affect the entire protocol.

Proof. As shown in FIG. 13, let us assume Adv successfully sends a bogus frame with $id^{Adv}$ and $D_{j,\gamma}^{Adv}$ where $id^{Adv} \equiv id_{j,\gamma}$ and $D_{j,\gamma}^{Adv} \equiv D_{j,\gamma}$, although the probability of success is negligible as shown earlier.

In such a case, the receiver ECU will accept it and wait for the frame with $id_{j,\gamma+1}$. $id_{j,\gamma}$ from a valid sender will be discarded in this case. However, the sender ECU will send $id_{j,\gamma+1}$ for the next frame, and then the receiver ECU will accept it again.

If Adv still generates 11 (or 29)−α+ζ-bit $id_h^{Adv_i}$ with A, and the target ECU $e_i$'s filter $F_i$, Adv still has to generate β-bit $A^{Adv}$ with fraudulent data $m^{Adv}$ without knowing $k_j^{\delta,I}$ and $REM_{j,\gamma}$. The probability that the attacker compromises both anonymous ID and MAC is $$\frac{1}{2^{11-\alpha+\zeta+\beta}}$$

for standard data frames and $$\frac{1}{2^{29-\alpha+\zeta+\beta}}$$

for extended data frames. The attacker can continuously mount this attack as far as the CAN bus has capacity of accommodating it.

Adv can also attempt to inject fraudulent Remote frames. Since the size of $id_{j,\gamma}^R$ for a Remote frame is only 16 (or 34)−α bits, the probability of success that Adv injects $id^{Adv}$, where $id^{Adv} \equiv id_{j,\gamma}^R$, could be higher. However, successful attacks only allow the sender ECU to transmit a Data frame, giving no meaningful benefit to Adv. Thus, this attack will be meaningful with data frame modification for which only M1 and M3 can proceed. In such a case, the probability that the attacker compromises both anonymous ID of a remote frame and MAC in the Data frame is $$\frac{1}{2^{16-\alpha+\beta}}$$

for the standard format and $$\frac{1}{2^{34-\alpha+\beta}}$$

for the extended format. Adv can continue transmitting the Remote frame as far as the CAN bus has capacity to accommodate the attack traffic, but the attack on the Data frame can proceed only once.

Additionally, the attacker can mount a brute-force attack to find $id^{Adv}, id^{Adv} \equiv id_{j,\gamma}$ or $id^{Adv} \equiv id_{j,\gamma}^R$ with A. Since $id_{j,\gamma}$ and $id_{j,\gamma}^R$ are used only once and only valid for one frame, the attacker is forced to guess the valid IDs on a per-frame basis. The attacker must therefore be able to transmit multiple fraudulent frames consecutively during one transmission interval, but such an attack is highly unlikely to succeed as we show below.

For the anonymous ID part (Step 1), Adv's probability of success is $$\frac{1}{2^{11-\alpha+\zeta}}$$

for the standard format and $$\frac{1}{2^{29-\alpha+\zeta}}$$

for the extended format, when α bits are assigned for the priority and ζ bits are assigned for additional anonymization bits. For the MAC part (Step 2), Adv's probability of success to find $A^{Adv}, A^{Adv} \equiv A_{j,\gamma}$ with A is 1/β, when β bits are assigned for the MAC.

Let's assume the worst case when Adv initiates a brute-force attack by transmitting 44-bit (0 bit for the data field in FIG. 2) frames on the CAN bus of 1 Mbps (i.e., maximum CAN bandwidth) and 100% utilization (usually 30-40% utilization). Then, Adv can theoretically transmit up to 22727 frames per second (assuming there is no frame drop), Adv's chances are limited to the interval p of frame transmission. When p=1000 ms, Adv can try up to 22727 ($<2^{15}$) times, and when p=5 ms, Adv can try up to 113 ($<2^7$) times.

Manufacturers can flexibly assign α bits from the ID field and ζ bits from the data field for anonymous ID and β bits for MAC, depending on the CAN design. For example, the attack's success probability for the standard format is $$\frac{1}{2^{45}},$$

where α=6, ζ=8, and β=32. In this case, a brute-force attack is infeasible even when the frame interval p=1000 ms. Also, even ζ=0, for Adv to succeed in the attack for the frame with p=5 ms is obviously infeasible. Note that attacks can be mounted via the CAN bus, and are thus limited by the CAN's communication bandwidth.

Security of IA-CAN against modification is also demonstrated. Since the Remote frame modification only results in frame drops and gives no incentive for Adv, we only assume Adv try to modify a Data frame over CAN from the sender ECU.

Suppose Adv modifies a target frame with $id_{j,\gamma}$ that is being transmitted on the CAN bus. Adv can try to modify $m_{j,\gamma}$ and $D_{j,\gamma}$ to $m_{j,\gamma}^{Adv}$ and $D_{j,\gamma}^{Adv}$ without knowing $k_j^{\delta,P}$ (only with A). Adv's probability of success in finding $D^{Adv}, D^{Adv} \equiv D_{j,\gamma}$, without $k_j^{\delta,P}$ is $1/2_\beta$, when β bits are assigned for the MAC. Adv can mount this attack once only when the target frame is being transmitted by legitimate sender ECU.

Next, the resilience of IA-CAN against replay attacks is shown. For this type of attack, Adv captures frames and tries to use them for the next frame transmission or session. Suppose Adv captures an anonymous ID $id_{j,\delta}$ and sends the target ECU $e_i$ forged frames with $id_{j,\delta}$.

Adv's attempts will fail because the filter $id_{j,\delta}$ to $id_{j,\delta}$ during the anonymous ID generation phase after receiving $id_{j,\delta}$, and $id_{j,\delta}$ is no longer valid. All valid IDs are discarded by $F_i$ as shown in FIG. 3. Adv cannot resend $D_{j,\gamma}$ as $D_{j,\gamma+1}$ either, since $REM_{j,\gamma+1} \neq REM_{j,\gamma}$.

Adv may capture $sel_{j,\delta}$ and try to send it for a fraudulent update to use captured IDs. Suppose Adv has $id^{Adv}, id^{Adv} \equiv id_{j,\gamma}$ and $e_i$ receives the bogus frame to refresh the session. However, to make $e_i$ accept $sel_{j,\delta}$ as $sel_{j,\delta+1}$, Adv should be able to make $e_i$ use $REM_{j,\gamma}$ for $Update_{j,\delta}$ to be verified as $Update_{j,\delta+1}$. The probability that $REM_{j,\gamma} = REM_{j,\gamma+1}$ is negligible.

Lastly, the security of IA-CAN is shown against interruption. Adv generates a number of frames for arbitrary target ECUs using compromised (or attached) ECUs. Since the attacker's objective is to cripple in-vehicle communications by disabling target ECUs, he may attempt to generate a large number of high-priority frames, which the target ECUs will accept.

Under IA-CAN, since ECUs update the acceptance filters on a per-frame basis, such flooding attacks are prevented. The process of checking an anonymous ID is the same as the general CAN architecture described earlier. Checking the additional bits in the data field is $\zeta$ bitwise operations which incur negligible overhead. For the data frame, the ECU only checks the authenticity of payload in the frame that passed through the frame filters.

Adv with M1, M2, or M3 can mount starvation attacks so that the victim ECUs may not receive frames from the CAN bus. Adv may try to disable specific targets or the entire network.

Adv with M1 and M3 can overwrite bits into anonymous ID $id_{j,\gamma}$ that will lead the receiver ECU to drop the frame. As described earlier, if time synchronization is available, under A2, the receiver updates anonymous ID $id_{j,\gamma}$ to $id_{j,\gamma+1}$ after the time $T_j$ elapsed.

Another way of mounting a DoS attack on CAN is just flooding a large number of high-priority (garbage) messages on the CAN bus. For example, flooding an ID with 0x00 will always win the bus arbitration. Although there is no way to prevent attackers from broadcasting bogus messages to overload the CAN, several research efforts introduced intrusion detection mechanisms against such flooding attempts on CAN. Moreover, initiating a fail-safe mode when ECUs do not receive frames within a certain time will effectively give resiliency against such an attack.

Performance of the IA-CAN is evaluated below. Table II lists the computations required for IA-CAN, where H is the amount of computation for a cryptographic one-way compression function such as SHA-1, XOR the computation of XOR, and F the amount of computation for a non-cryptographic function that divides one string into multiple parts. The overheads of XOR and F are negligible compared to H.

TABLE II

Computation overhead

| Phase | Computation | Operation |
| --- | --- | --- |
| Session refresh | 3 H | Session initiation time |
| Anonymous ID generation | 1 H + 1 F | Idle-time |
| Payload authentication code generation | 1XOR + 1 H | Run-time (Sender) |
| Data frame authentication | 1XOR + 1 H | Run-time (Receiver) |
| Remote frame authentication | 1XOR | Run-time (Receiver) |

Even a millisecond computation delay may result in unpredictable vehicle control behavior (often related to safety). It is therefore important to consider the time overhead of hash computations. Based on both performance and cost considerations, ECUs are usually built with 8- to 32-bit microprocessors with various capabilities. Let $t_l$ ($t_h$) be the computation time of H in a low-end (high-end) microprocessor. To estimate $t_l$ and $t_h$, the overheads for 8-bit, 16 MHz Arduino UNO R3 for low-end processors and 32-bit, 40 MHz Chipkit 32MAX for high-end processors by implementing the HMAC-SHA1 function were evaluated. More specifically, four example cases were evaluated: SHA-1 with 64-byte key (A.1), SHA-1 with 20-byte key (A.2), SHA-1 with 100-byte key (A.3), and SHA-1 with 49-byte key, truncated to 12-byte HMAC (A.4).

TABLE III

Average computation time for HMAC with SHA-1 on a low-end microprocessor (8-bit, 18 Mhz Arduino UNO R3) and a high-end processor (32-bit 40 MHz Chipkit 32MAX)

| | $t^l$, 8 bit, 16 Mhz Arduino UNO R3 | | $t^h$, 32 bit, 40 Mhz Chipkit 32MAX | |
| --- | --- | --- | --- | --- |
| Cases | 1 trial (µs) | 25,000 trials (µs) | 1 trial (µs) | 25,000 trials (µs) |
| A.1 | 12,152 | 287,506,800 | 230 | 5,717,186 |
| A.2 | 12,156 | 287,506,772 | 228 | 5,717,187 |
| A.3 | 12,160 | 287,506,768 | 228 | 5,718,086 |
| A.4 | 12,156 | 287,506,792 | 228 | 5,717,370 |

The result on the 8-bit microprocessor with a 16 MHz clock incurred an overhead $t_l$ of approximately 12 ms for one-time computation and 287 seconds for computation for 25,000 times, while the 32-bit microprocessor with a 40 MHz clock, exhibited an overhead $t_h$ of approximately 200 µs for one-time computation and 5.7 seconds for computation for 25,000 times in each of the scenarios as listed in Table III. Computation of SHA-1 is shown to take less than 1.2 ms on an 80 Mhz 16-bit microprocessor. Mathematica is shown to take approximately 2 ms for one time computation and 32 seconds for 25,000 times computation on the Intel i7 2.7 GHz dual core; these numbers are used for the attack simulation.

In contrast, it takes only about 4 µs to perform bit-comparison for 25,000 times on the 8-bit Arduino UNO R3, which is negligible, compared to the time required to generate MAC once on the same microprocessor.

Commonly-used payload authentication models invoke the cryptographic computation before an ECU transmits each frame, and also after the ECU receives it. The actual frame latency thus depends on the cryptographic computation time $t_m$, and hence the previous models focused on how to reduce the message authentication delay $t_m$. One such example is the protocol in which reduces the delay by authenticating 4/8 frames at a time. This approach incurs less overhead but, since the message can be authenticated only after receiving all the frames, it still incurs a long frame latency.

Figures 14A, 14B:
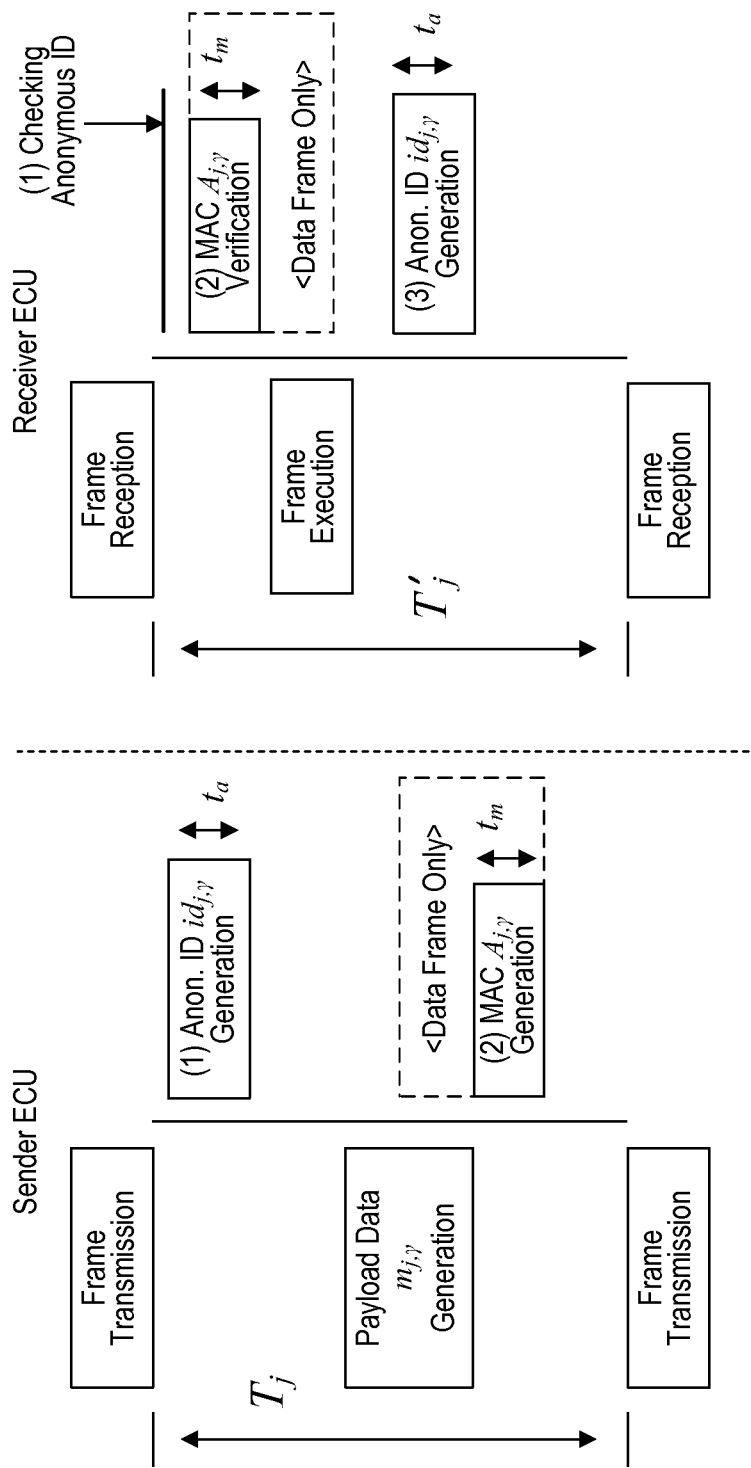
FIGS. 14A and 14B are diagrams illustrating the authentication process in relation to the sending controller and the receiving controller, respectively.

Although IA-CAN performs a two-step authentication process, the runtime latency of IA-CAN is not different from previous models, since the first step that generates an anonymous ID is computed only during an idle time as depicted in FIG. 14. The latency of checking IDs in the filter remains the same as the original CAN model.

Let $T_j^l$ ($T_j^h$) be the period of low (high) frequency frames. The periods of CAN frame transmissions used in several SAE range from 5 to 1000 ms. Usually, higher-end processors are used for more critical processes with higher frequencies and shorter periods (e.g., $T_j^h \approx 5$ ms), while lower-end processors are used for less critical processes with lower frequencies (e.g., $T_j^l \gg 100$ ms).

To guarantee the feasibility of IA-CAN, the inequality $T_j \gg t'$ (as depicted in FIG. 12) should hold, where $T_j$ is the frame transmission interval time at the sender side. t' is the computation time required for a session update including verification, key generation, and anonymous ID generation, and $t_n$ for anonymous ID generation, where $t' \approx 3t_n$. For the frame arrival interval $T'_j$ at the receiver side $T'_j, T'_j \geq T_j$, due to the possible transmission latency of CAN. The results show $T'_j \gg t_n^l$ and $T_j^h \gg t_n^h$, and hence IA-CAN easily satisfies the inequality $T_j \gg t'$. That is, an anonymous ID generation is trivially done within idle time.

An anonymous ID of IA-CAN only invokes bit-comparison before transmitting a frame and after receiving it, so the runtime frame latency is negligible. For full steps of IA-CAN, the sender ECU computes MAC for payload authentication just before its transmission, and the receiver ECU also computes MAC after performing IA-CAN. While both IA-CAN and MAC generation incur the computation overhead, the runtime latency is still $t_m$, contributed only by MAC generation. Note that HMAC-SHA1 is used for the evaluation purpose mentioned earlier, and does not exclude use of other algorithms for MAC and anonymous ID generation.

Performance of IA-CAN under attack is also evaluated. For attack scenarios, it can be assumed that the attacker transmits bogus frames to a certain target where the following aspects must be considered.

For bus speed (i.e., 125/500/1000 kbps), currently, the CAN standard supports up to 1 Mbps, while practical implementations still use 125 kbps.

For bus utilization, practical implementations utilize 20-30% of CAN bandwidth to ensure that all frames will meet their deadlines. There have been numerous efforts to increase bus utilization, so it is assumed the maximum 100% utilization as an ideal case.

For frame length, 44-108 bits for the standard format. The actual number of bits in a frame without accounting for the data field is 44 bits with 1 bit SOF (Start of Frame), 12 bits for arbitration, 6 bits for control, 16 bits for CRC, 2 bits for ACK, and 7 bits EOF (End of Frame). The size of data field ranges from 0 to 8 bytes.

For frame interval (i.e., 5/100/500/1000 ms), these intervals are pre-defined by the vendors, and example numbers are taken from the SAE benchmarks.

For attacker's bus occupation (up to 100), while the attacker can increase data transmission by a negligibly small amount, we also consider the case when he occupies the entire bus.

For length of an anonymous ID, 16 bits for an anonymous ID is used in IA-CAN. 16 bits are assigned for fair comparison with 16 bit-truncated MAC for the payload authentication model. Assuming 5 bits assigned for priority, 6 bits are assigned in the ID field for $id_{j,\gamma}^1$ and 10 bits in the data field for $id_{j,\gamma}^2$. For IA-CAN for Data frame, two cases are shown: assigning 6 bits for $id_{j,\gamma}^1$ (small ID) and 16 bits for $id_{j,\gamma}^1+id_{j,\gamma}^2$. For Remote frame case, $\alpha=0$. For the size of Message Authenticate Code (MAC), 16 bits of truncated MAC are used for general payload authentication as well as IA-CAN for data frame. 8 or 32 bits can also be assigned.

Assuming an attacker occupies the entire bus utilizing 100% of its bandwidth, the maximum number of possible attack trials are specified as in Table IV. Note that the case when attackers mounts DoS attacks on CAN bus itself is not considered.

TABLE IV

The maximum possible number of trials an attacker can make on a 100% utilized bus, 100% attacker occupied, transmitting a 40-bit frame.

| Bandwidth | Maximum possible trials for the frame interval of | | | |
|---|---|---|---|---|
| | 1000 ms | 500 ms | 100 ms | 5 ms |
| 1000 | 25,000 | 12,500 | 2,500 | 125 |
| 500 | 12,500 | 6,250 | 1,250 | 62 |
| 125 | 3,125 | 1,562 | 312 | 15 |

Simulation results were obtained for the following four models:

Data in the payload authentication model (PA)/M1, M2, M3

IA-CAN for the Remote frame (anonymous ID only)/M2 only

IA-CAN for the Data frame assigning $\zeta$ bits/M1, M2, M3

IA-CAN for the Data frame without $\zeta$ bits/M1, M2, M3

IA-CAN for a Remote frame contains only an anonymous ID, while that for a Data frame contains both anonymous ID and payload authentication. A 16-bit anonymous ID is assigned in IA-CAN for a Remote frame, a 6- or 16-bit anonymous ID is used in IA-CAN for a Data frame. For a fair comparison, a 16-bit MAC is assigned for payload authentication.

It is also assumed the ideal attack scenarios in which an attacker occupies the entire bus utilizing 100% of its bandwidth and the maximum number of available attack trials is specified as in Table IV. Simulated attacks were tested using Mathematica on an Intel i7 2.7 GHz dual core processor. HMAC-SHA1 operation is computed 25000 times for each frame, which takes approximately 31 seconds in this setting.

Six ideal attack cases are shown, where the attacker transmits 40-bit bogus frames, occupying the entire bandwidth of a 100%-utilized bus. The first three cases are for the frames with a 100 ms inter-arrival interval, and the last three cases for the frames with a 5 ms interval, on 125 kbps, 500 kbps, and 1 Mbps buses in sequence.

Case 1: p=1000 ms. In this scenario, the attack proceeds with frames at a 1000 ms-interval on the 125/500/1000 kbps CAN bus. IA-CAN for the remote frame takes approximately 20/70/134 ms, while the general PA using MAC takes 4/16/31 seconds, exceeding the 1000 ms time-bound. Using IA-CAN for the data frame, assignment of 6-bit anonymous IDs takes 90/400/679 ms which is still far below the 1000 ms bound, while assigning 16-bit anonymous IDs still takes 30/70/156 ms.

Case 2: p=5 ms. In this scenario, the attack proceeds with frames at a 5 ms-interval on the 125/500/1000 kbps CAN bus. IA-CAN for the remote frame takes approximately 1.7/2.4/3.2 ms, while the general PA using MAC takes 23/85/167 ms, which exceeds the 5 ms time-bound. Using IA-CAN for the data frame, assignment of 6-bit anonymous IDs takes 4.1/4.8/8.2 ms, while assigning 16-bit anonymous IDs still takes 2.8/4.6/5 ms.

Cases 2 show that the computation of IA-CAN for data frame when a small ID (6 bits) may exceed the time-bound on a high-speed bus because with a high probability, there will be collision from $2^6$ bits. Thus, to avoid such an overhead, assigning more bits ID with $id_{j,\gamma}^2$, is recommended. In fact, 100% bus utilization with 100% bus occupation for one frame is unlikely in reality; the bus utilization is usually 30-40%.

In comparison, IA-CAN is very efficient, not incurring any additional notable runtime overhead for anonymous ID compared to previous models. Although previous models that only provide payload authentication using MAC can achieve the authenticity of payload data, the computation overhead incurred by a DoS attacker as is plotted. Simulation results show that the general PA models incur approximately 285× more computation overhead than IA-CAN under attacks. Table V compares the models summarizing the results discussed above.

TABLE V

| | Design comparison | | |
|---|---|---|---|
| | DoS resilience | Run-time Latency | |
| Type | on ECU | Normal | Attack exists |
| Payload authentication | X | $t_m$ | Exceed time bound |
| IA-CAN (remote frame) | O | negligible | within time bound |
| IA-CAN (without ζ bits) | O | $t_m$ | within time bound |
| IA-CAN | O | $t_m$ | within time bound |

The ID anonymized protocol can be extended to support communications outside of the vehicle network. In remote access or V2X communications, the compromised ECUs that interconnect the external entities to the in-vehicle network, are still susceptible to intelligent attacks. The attackers could compromise the gateway ECUs (or any ECUs with external interface) and send malicious information into the in-vehicle network.

Figure 15:
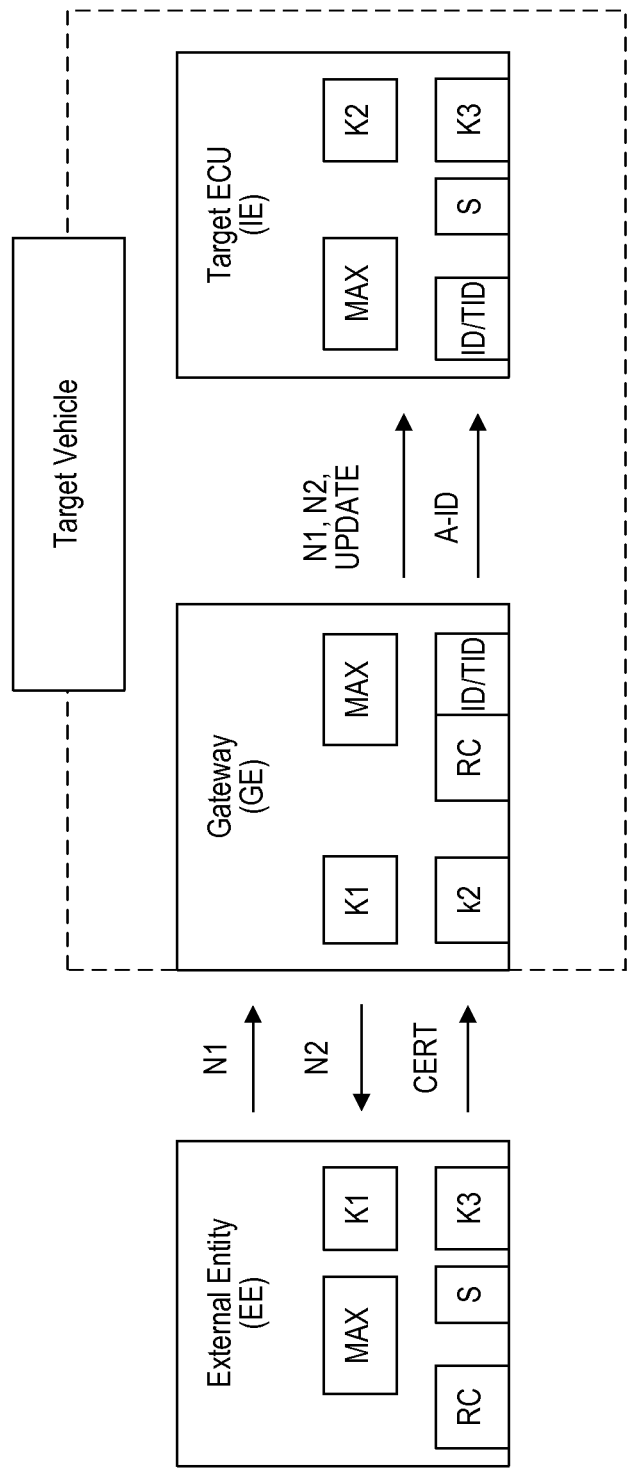
FIG. 15 is a diagram depicting a system model extending the ID anonymization protocol outside the vehicle.

For external communication, the extended IA-CAN is modified as follows. With reference to FIG. 15, an external entity sends a remote command to the gateway ECU. The external entity (EE) wants to initiate a new session of RC1 with a gateway ECU (GE). A known protocols can be used to establish a secure channel. As a result of the establishment, EE and GE share a secret key (K1). EE sends a random nonce (N1) to GE using the secure channel. EE first generates N1 and H{N1}, where H{N1} is hash of N1. EE then encrypts N1 and H{N1} with K1. That is, EE→GE: ENC(K1,N1,H{N1}). GE decrypts N1 and H{N1} using K1, and checks the integrity of N1 and H{N1}. Next, GE generates a second random nonce (N2) and another hash value H{N1|N2}, then encrypt them with K1. GE sends it to EE as follows: GE→EE: ENC (K1,N2, H{N1|2}). As a result, GE and EE share N1 and N2. Purpose of sharing N1 and N2 is to guarantee the freshness of session between GE and EE.

After exchanging random nonces, EE selects RC1 and generates a certificate (CERT) to certify RC1 is requested by EE. The certification may be generated, for example by CERT=H{N1,N2,$S_i$}. A shared secret ($S_i$) is generated from $S_i-1$ and K3 as follows: H:{$S_{i-1}$,K3}->$S_i$. EE then sends RC1,CERT to GE as follows:

$$EE \rightarrow GE: ENC(K1, RC1, CERT, H\{RC1, CERT, N2, N1\})$$

GE can decrypt it and check the integrity of RC1 and CERT.

The gateway in turn sends the commands from the external entity to the target ECU. GE already knows N1 and N2. GE then looks up TID1 from ID1 with RC1. It is noted that GE knows RC1 and finds the in-vehicle message identifier (ID1) first, then finds a temporal identifier (TID1). GE generates UPDATE as follows: $f1$: (ID1,CERT,K2)→UPDATE, where $f1$ is a one-way function, $f1$: {a}→b, a is an input and b is the output from a. GE sends N1, N2, UPDATE in the same manner as described above for IA-CAN procedure. That is, GE→IE: N1,N2,UPDATE, where IE is the target ECU. IE receives UPDATE and generates CERT*. IE knows N1, N2 (just received) and $S_i$. IE also knows $S_i$ and K3. It follows that the certification is generated by CERT*=H{N1,N2,$S_i$}. IE now generates UPDATE* and compares to UPDATE which IE received, where F1: {id1,CERT*,K2}→UPDATE*. If UPDATE≡UPDATE*, then IE generates the new session key (which is updated k2), and sets the session counter to 0. MAX number of counter is preset. When the counter reaches to MAX, the session expires. If EE does not send new CERT to GE, GE has no more authority to send message to IE. AID generation and verification within the session is identical to IA-CAN.

When the attacker takes full control of the compromised gateway ECU, it results in complete failure in previous models. However, IA-CAN EXT limits the attacker's capability using the compromised gateway ECU only in session.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality. It is understood that grouping of operations within in a given module is not limiting and operations may be shared amongst multiple modules or combined into a single module.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic control unit, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a controller selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various electronic control units may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for authenticating data frames sent in a vehicle network of a vehicle, comprising:
    storing, by a receiving electronic control unit, a cryptographic key, where the cryptographic key is shared with a sending electronic control unit and the receiving electronic control unit is implemented on a hardware microprocessor;
    receiving, by the receiving electronic control unit, a current frame identifier in a data frame sent via a serial data link by the sending electronic control unit;
    generating, by the receiving electronic control unit, a next frame identifier in response to receiving the current frame identifier, where the next frame identifier is derived in part from the current frame identifier and the cryptographic key using an encoding function;
    storing, by the receiving electronic control unit, the next frame identifier in a data store for subsequent processing;
    receiving, by the receiving electronic control unit, another data frame subsequently to receiving the current frame identifier;
    extracting, by the receiving electronic control unit, a frame identifier from the another data frame without decoding any portion of the another data frame;
    comparing, by the receiving electronic control unit, the extracted frame identifier to the next frame identifier residing in the data store;
    processing, by the receiving electronic control unit, payload of the another data frame when the extracted frame identifier matches the next frame identifier; and
    discarding, by the receiving electronic control unit, the another data frame when the extracted frame identifier does not match the next frame identifier, wherein the data frame and the next frame are transmitted according to the priority specified in their frame identifiers.

2. The method of claim 1 wherein generating a next frame identifier further comprises using a keyed-hash function.

3. The method of claim 1 further comprises generating, by the receiving electronic control unit, a new frame identifier when the extracted frame identifier matches the next frame identifier and replacing the next frame identifier in the data store with the new frame identifier, where the new frame identifier is derived in part from the extracted frame identifier and the cryptographic key using an encoding function.

4. The method of claim 1 further comprises extracting, by the receiving electronic control unit, a message authentication code from the another data frame and authenticating the payload of the another data frame using the message authentication code, where the message authentication code differs from the extracted frame identifier and is derived in part from the payload in the another date frame and the steps of extracting and authenticating occur when the extracted frame identifier matches the next frame identifier and prior to the step of processing the payload of the another data frame.

5. The method of claim 1 further comprises initiating a session between the sending electronic control unit and the receiving electronic control unit by
    selecting, by the sending electronic control unit, a nonce;
    selecting, by the sending electronic control unit, a hash function for key generation;
    selecting, by the sending electronic control unit, a keyed hash function for message authentication;
    generating, by the sending electronic control unit, a hash output by applying the selected keyed hash function to an identifier for the sending electronic control unit, the nonce, and the cryptographic key; and
    sending, by the sending electronic control unit, an initiation data frame via the serial data link to the receiving electronic control unit, where the initiation data frame includes an identifier for the sending electronic control unit, the nonce, the hash value, an indicator for the hash function, an indicator for the keyed hash function and the hash output.

6. The method of claim 5 further comprising
    receiving, by the receiving electronic control unit, the initiation data frame;
    determining, by the receiving electronic control unit, the selected keyed hash function from the initiation data frame;
    generating, by the receiving electronic control unit, a hash output by applying the selected keyed hash function to the identifier for the sending electronic control unit, the nonce, and the cryptographic key retrieved from the initiation data frame;
    generating, by the receiving electronic control unit, a session key by applying the selected hash function to the nonce and the cryptographic key when the generated hash output matches the hash output retrieved from the initiation data frame.

7. The method of claim 1 wherein data frames received by the receiving electronic control unit do not include an identifier for the receiving electronic control unit.

8. The method of claim 1 wherein the serial data link is further defined as a controller area network.

9. The method of claim 1 wherein the serial data link is further defined as a Local Interconnect Network.

10. A system for authenticating data frames sent in a vehicle network of a vehicle, comprising:
    a hardware processor implementing a receiving electronic control unit including:
        a cryptographic key residing in a data store of the receiving electronic control unit, where the cryptographic key is shared with a sending electronic control unit;
        a next frame identifier residing in a data store of the receiving electronic control unit;
        a filter configured to receive a data frame sent via a vehicle network by the sending electronic control unit, the filter extracts a frame identifier from the received data frame without decoding any portion of the data frame and compares the extracted frame identifier with the next frame identifier;

a message authenticator configured to receive the data frame from the filter and process payload of the data frame when the extracted frame identifier matches the next frame identifier; and an ID generator configured to receive the extracted frame identifier and, when the extracted frame identifier matches the next frame identifier, generate a new frame identifier and replace the next frame identifier in the data store with the new frame identifier, where the new frame identifier is derived in part from the extracted frame identifier and the cryptographic key using an encoding function and the data frame and the next frame are transmitted according to the priority specified in their frame identifiers, wherein the filter, the message authenticator and the ID generator are implemented by the receiving electronic control unit.

11. The system of claim 10 wherein the filter discards the data frame when the extracted frame identifier does not match the next frame identifier.

12. The system of claim 10 wherein the message authenticator extracts a message authentication code from the data frame and authenticates payload of the data frame prior to processing the payload of the data frame, where the message authentication code differs from the extracted frame identifier and is derived in part from the payload in the another date frame.

13. The system of claim 12 wherein the message authenticator authenticates the payload of the data frame using a cyclic redundancy check.

14. The system of claim 10 wherein the vehicle network is further defined by a serial data bus residing in a vehicle.

15. The system of claim 10 wherein the data frame is communicated in accordance with the Controller Area Network.

16. The system of claim 10 wherein the encoding function is further defined as a keyed-hash function.

17. A system for authenticating data frames in a vehicle network of a vehicle, comprising:

a sending electronic control unit coupled to a vehicle network and implemented by a hardware processor, the sending electronic control unit including:
  a send data store that stores a next frame identifier;
  a send module configured to retrieve the next frame identifier from the send data store, format a data frame with the next frame identifier and transmit the data frame over the vehicle network;
  an ID generator configured to retrieve the next frame identifier from the send data store, generate a new frame identifier based in part on the next frame identifier and replace the next frame identifier residing in the send data store with the new frame identifier; and a receiving electronic control unit coupled to the vehicle network and implemented by a hardware processor, the receiving electronic control unit including:
  a receive data store that stores the next frame identifier;
  a filter configured to receive the data frame sent via the vehicle network by the sending electronic control unit, extract the next frame identifier from the received data frame without decoding any portion of the data frame and compare the extracted frame identifier with the next frame identifier residing in the receive data store;
  a message authenticator configured to receive the data frame from the filter and process payload of the data frame when the extracted frame identifier matches the next frame identifier residing in the receive data store; and
  an ID generator interfaced with the message authenticator and configured to generate a new frame identifier and replace the next frame identifier in the receive data store with the new frame identifier when the extracted frame identifier matches the next frame identifier residing in the receive data store wherein the data frame and the next frame are transmitted according to the priority specified in their frame identifiers.

18. The system of claim 17 wherein the filter discards the data frame when the extracted frame identifier does not match the next frame identifier residing in the receive data store.

19. The system of claim 17 wherein the ID generator of the receiving electronic control unit generates the new frame identifier from the extracted frame identifier and a cryptographic key using a keyed-hash function.

20. The system of claim 17 wherein the vehicle network is further defined by a serial data bus and the data frame is communication in accordance with the Controller Area Network.

* * * * *